United States Patent
Kinouchi et al.

(10) Patent No.: US 11,588,359 B2
(45) Date of Patent: Feb. 21, 2023

(54) ROTATING ELECTRIC MACHINE

(71) Applicant: KABUSHIKI KAISHA TOSHIBA, Tokyo (JP)

(72) Inventors: Hiroaki Kinouchi, Meguro Tokyo (JP); Tomohiro Suetsuna, Kawasaki Kanagawa (JP); Naoyuki Sanada, Kawasaki Kanagawa (JP); Masaya Hagiwara, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 177 days.

(21) Appl. No.: 17/196,182

(22) Filed: Mar. 9, 2021

(65) Prior Publication Data
US 2022/0085669 A1    Mar. 17, 2022

(30) Foreign Application Priority Data
Sep. 17, 2020    (JP) .............................. JP2020-156171

(51) Int. Cl.
*C22C 33/00*    (2006.01)
*H01F 1/08*    (2006.01)
(Continued)

(52) U.S. Cl.
CPC ............... *H02K 1/02* (2013.01); *C22C 33/00* (2013.01); *H01F 1/0556* (2013.01); *H01F 1/08* (2013.01);
(Continued)

(58) Field of Classification Search
CPC ......... C22C 33/00; C22C 33/02; C22C 38/00; C22C 38/001; C22C 38/08; C22C 38/10;
(Continued)

(56) References Cited

U.S. PATENT DOCUMENTS

2017/0076845 A1*  3/2017  Suetsuna ................... H01F 1/28
2017/0209924 A1*  7/2017  Suetsuna ............... C22C 38/002
(Continued)

FOREIGN PATENT DOCUMENTS

JP         3714662 B2     11/2005
JP       2011-30334 A     2/2011
(Continued)

OTHER PUBLICATIONS

F. Profumo et al., "Novel Axial Flux Interior PM Synchronous Motor Realized with Powdered Soft Magnetic Materials," Proc. of IEEE Industry Applications Conf., 33$^{rd}$ IAS Annual Meeting, vol. 1, pp. 152-158 (1998).

(Continued)

*Primary Examiner* — Michael Andrews
(74) *Attorney, Agent, or Firm* — Finnegan, Henderson, Farabow, Garrett & Dunner, LLP

(57) ABSTRACT

A rotating electric machine according to embodiments is a rotating electric machine including a rotor including a first core and being capable of rotating around a rotating shaft; and a stator disposed to face the rotor in the axial direction of the rotating shaft, the first core including a first pressed powder material having a plurality of first flaky magnetic metal particles and a first intercalated phase, the first flaky magnetic metal particles having an average thickness of from 10 nm to 100 μm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000, the first intercalated phase existing between the first flaky magnetic metal particles and including at least one second element selected from the group consisting of oxygen (O), (Continued)

carbon (C), nitrogen (N), and fluorine (F), wherein in the first pressed powder material, the first flat surfaces are oriented approximately in parallel with a first principal plane of the first pressed powder material and have the difference in magnetic permeability on the basis of direction within the first principal plane, and the first principal plane of the first pressed powder material is disposed to be approximately perpendicular to the radial direction of the rotating electric machine.

16 Claims, 30 Drawing Sheets

(51) Int. Cl.
  *H02K 1/02* (2006.01)
  *H02K 1/14* (2006.01)
  *H02K 21/24* (2006.01)
  *H02K 1/24* (2006.01)
  *H02K 1/2793* (2022.01)
  *H01F 1/055* (2006.01)

(52) U.S. Cl.
  CPC ............ *H02K 1/145* (2013.01); *H02K 1/146* (2013.01); *H02K 1/243* (2013.01); *H02K 1/2793* (2013.01); *H02K 21/24* (2013.01)

(58) Field of Classification Search
  CPC ....... C22C 38/105; H01F 1/08; H01F 1/0556; H01F 1/09; H01F 1/12; H01F 1/147; H01F 1/14708; H02K 1/02; H02K 1/145; H02K 1/146; H02K 1/243; H02K 1/2793; H02K 21/24
  USPC ............................ 428/FOR. 169; 310/156.32
  See application file for complete search history.

(56) References Cited

U.S. PATENT DOCUMENTS

| | | | |
|---|---|---|---|
| 2018/0258513 A1* | 9/2018 | Suetsuna | C22C 38/10 |
| 2019/0238021 A1 | 8/2019 | Kinouchi et al. | |
| 2019/0283127 A1* | 9/2019 | Kinouchi | H01F 1/24 |
| 2020/0035391 A1 | 1/2020 | Suestuna et al. | |
| 2020/0043639 A1 | 2/2020 | Suestuna et al. | |
| 2020/0082963 A1 | 3/2020 | Suestuna et al. | |
| 2020/0303106 A1 | 9/2020 | Suestuna et al. | |
| 2020/0340087 A1 | 10/2020 | Suestuna et al. | |
| 2021/0082608 A1 | 3/2021 | Sanada et al. | |
| 2021/0305851 A1 | 9/2021 | Sanada et al. | |
| 2022/0072606 A1 | 3/2022 | Suetsuna et al. | |

FOREIGN PATENT DOCUMENTS

| | | |
|---|---|---|
| JP | 2011-166926 A | 8/2011 |
| JP | 2017-59816 A | 3/2017 |
| JP | 2017-135358 A | 8/2017 |
| JP | 2018-152449 A | 9/2018 |
| JP | 2019-58014 A | 4/2019 |
| JP | 2019-161183 A | 9/2019 |
| JP | 2020-25077 A | 2/2020 |
| JP | 2020-43268 A | 3/2020 |
| JP | 2020-155525 A | 9/2020 |
| JP | 2021-48238 A | 3/2021 |
| JP | 2021-147651 A | 9/2021 |
| JP | 2022-43455 A | 3/2022 |
| WO | WO 2019/058602 A1 | 3/2019 |

OTHER PUBLICATIONS

N. C. Halder et al., "Separation of particle size and lattice strain in integral breadth measurements," Acta. Cryst. vol. 20, pp. 312-313 (1966).

* cited by examiner

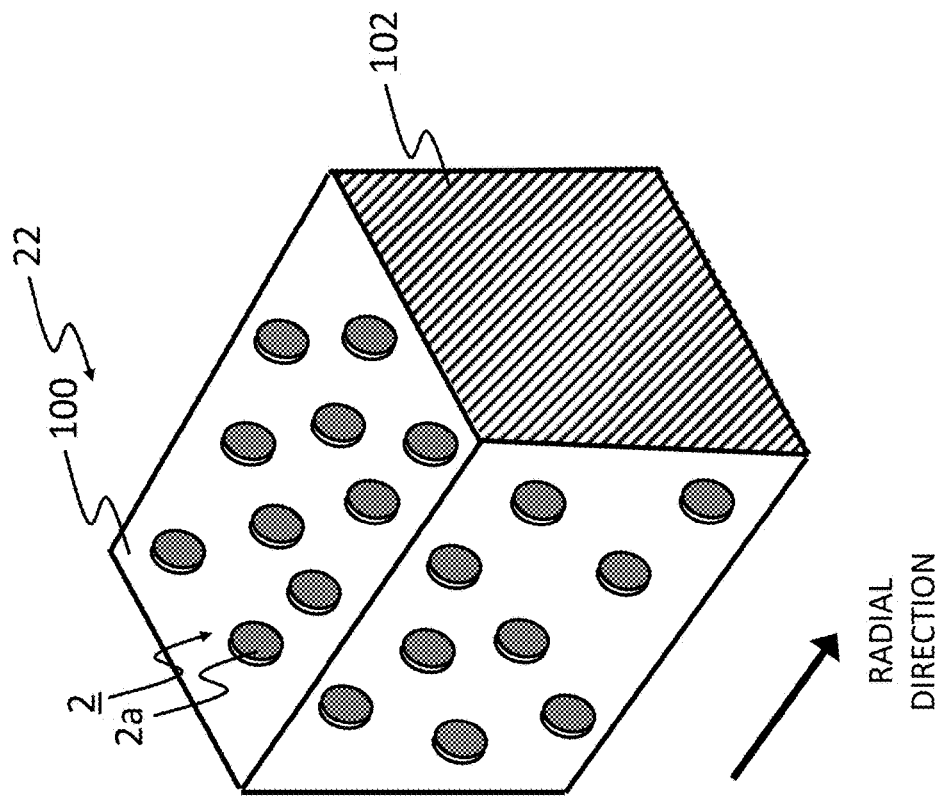
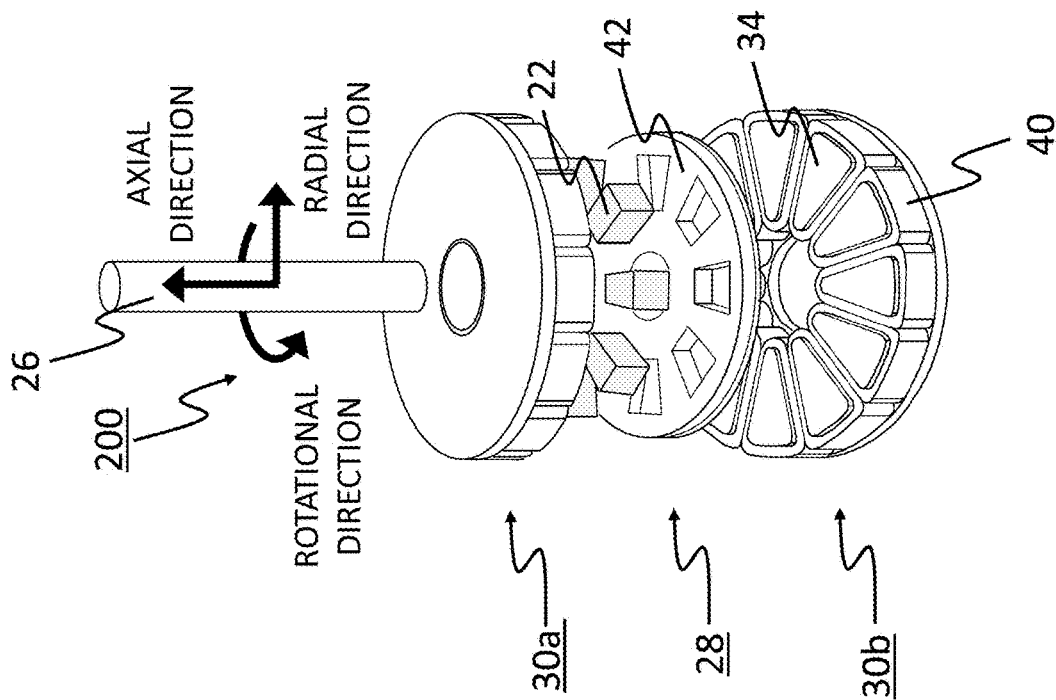
Fig.1

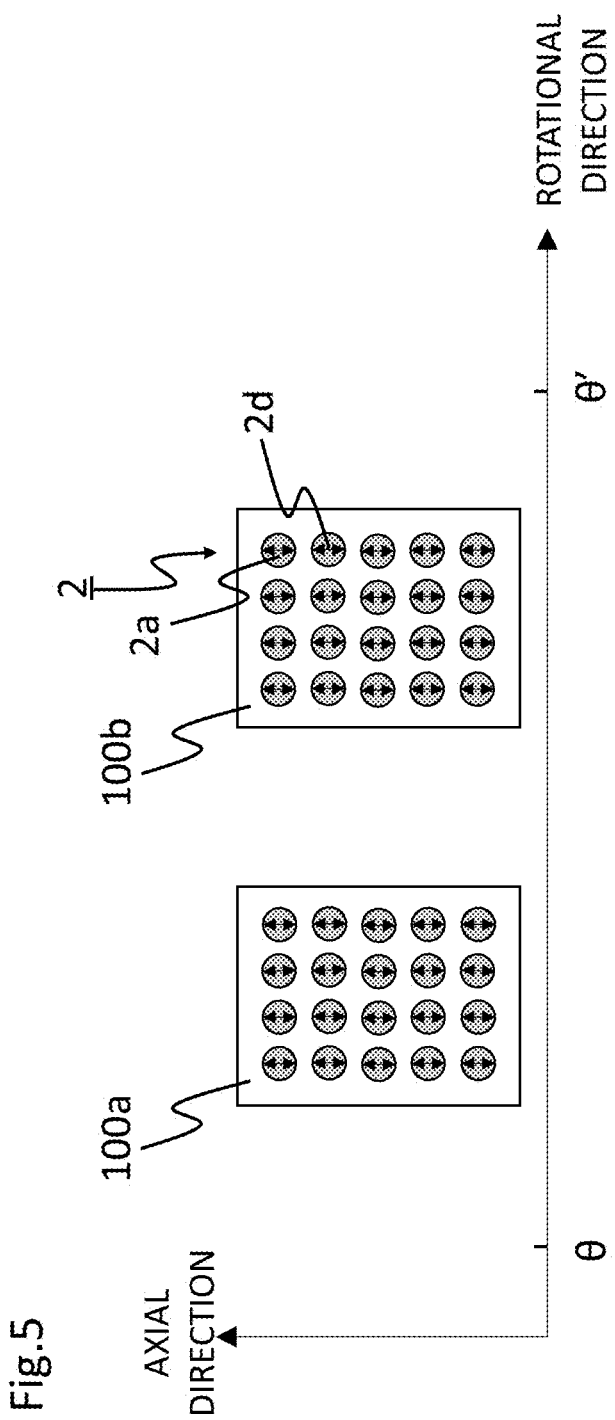

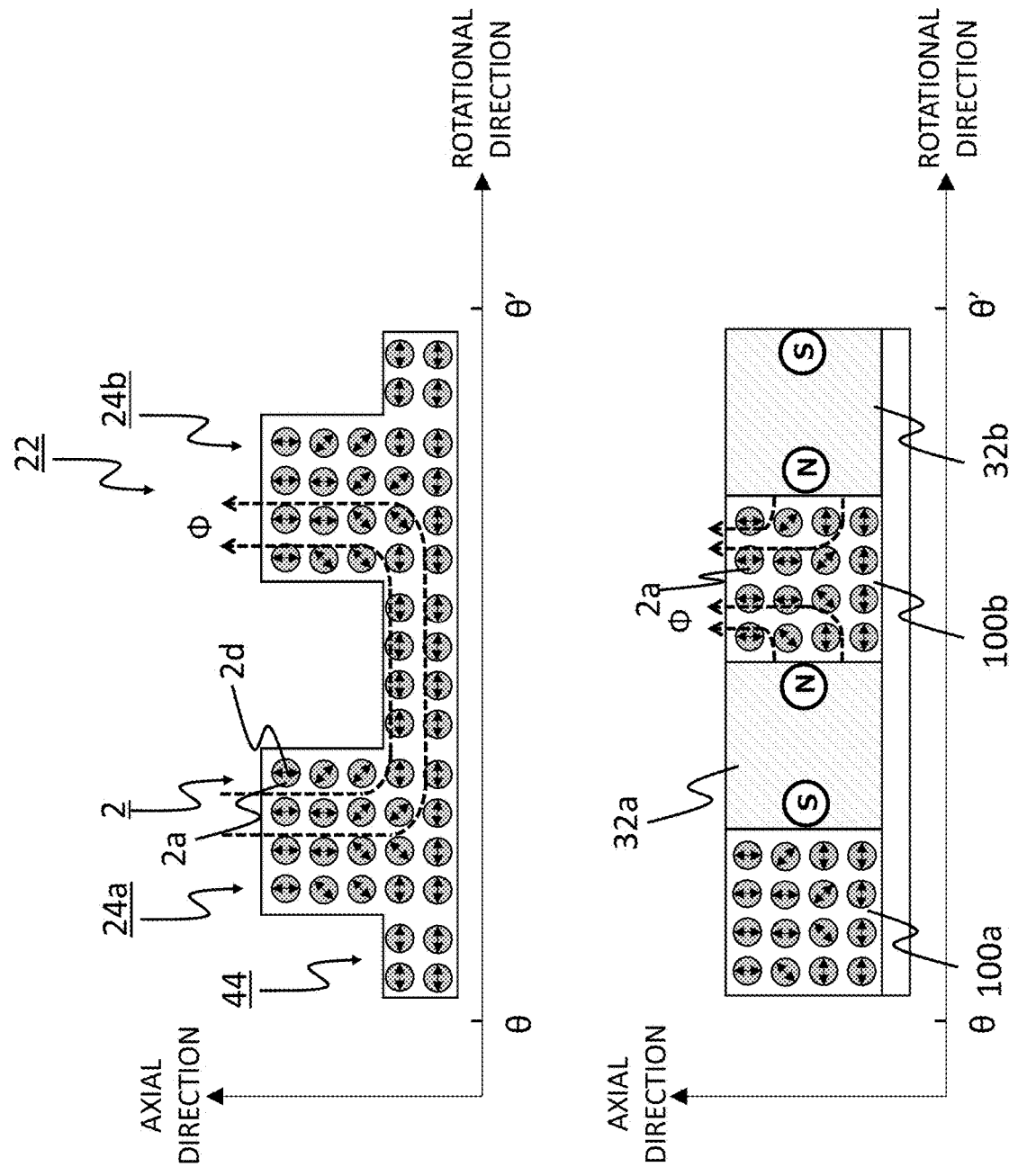

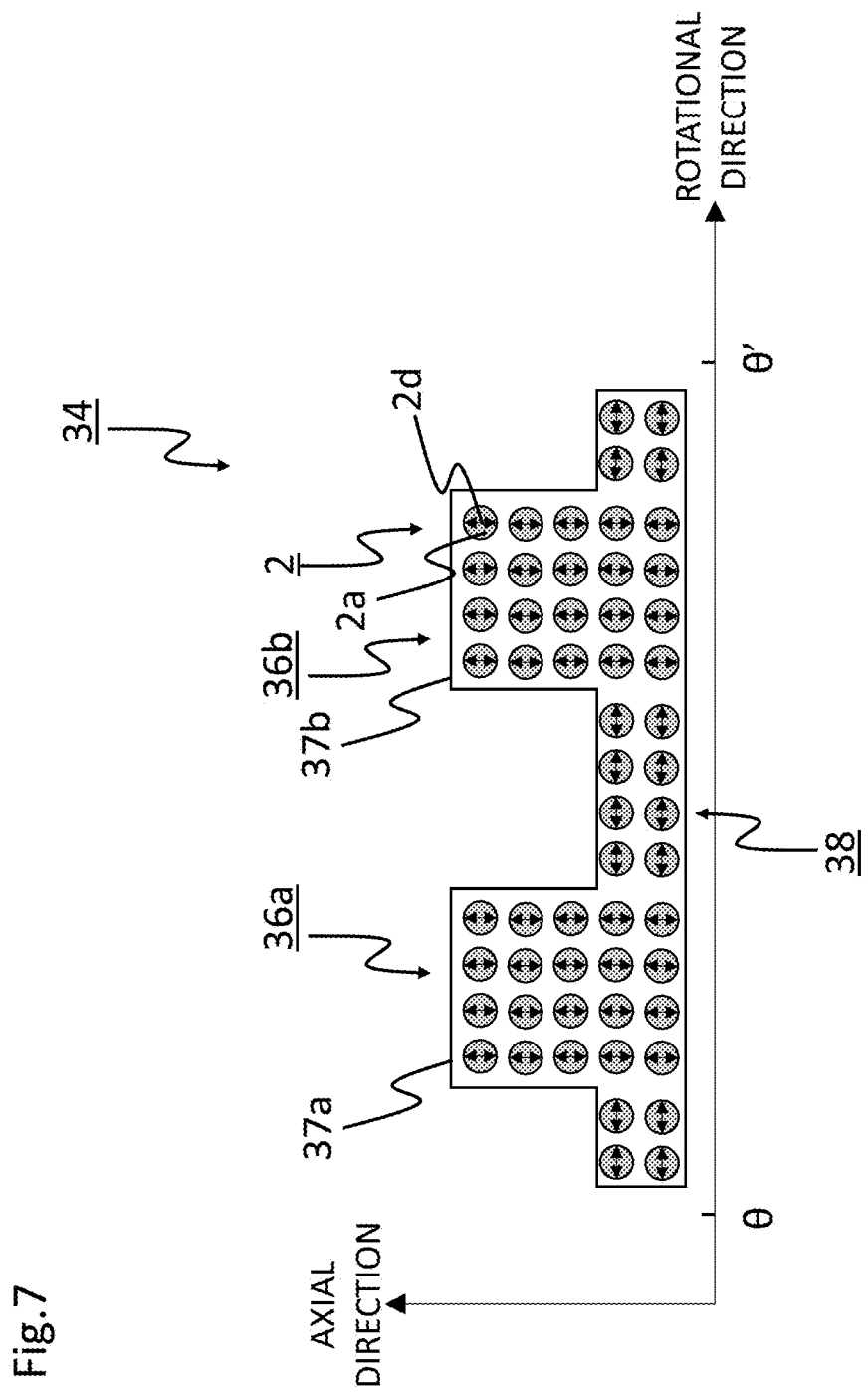

Fig.12 PERSPECTIVE VIEW

Fig.14 PERSPECTIVE VIEW

PERSPECTIVE VIEW

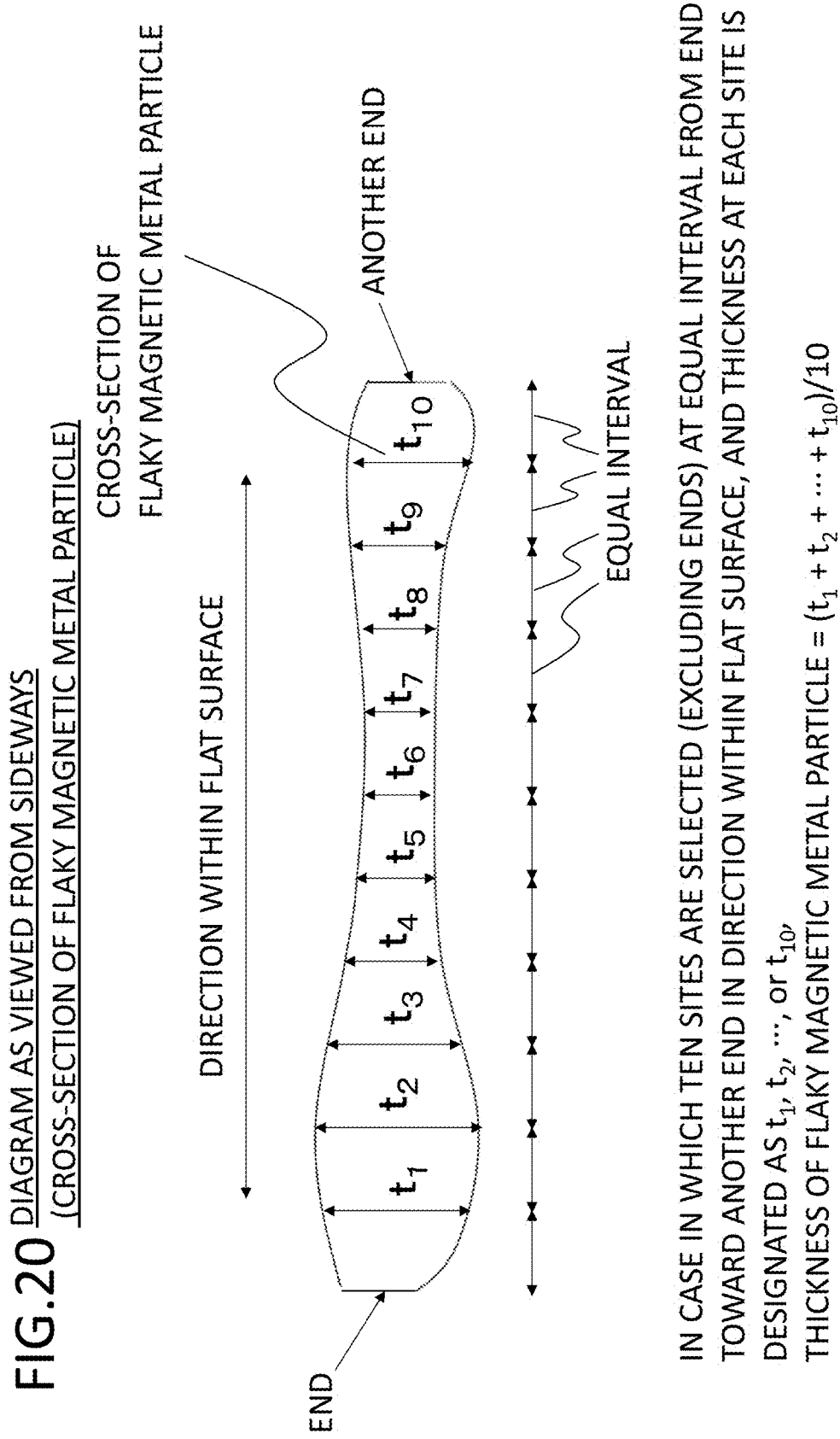

DIAGRAM AS VIEWED FROM TOP (FLAT SURFACE OF FLAKY MAGNETIC METAL PARTICLES)
Fig.21A IN CASE OF TRIANGLE
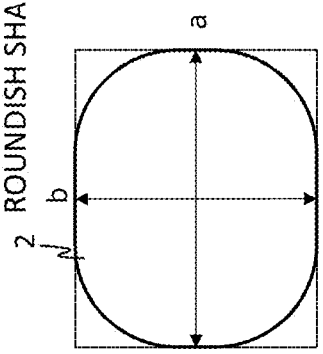
Fig.21B IN CASE OF QUADRILATERAL
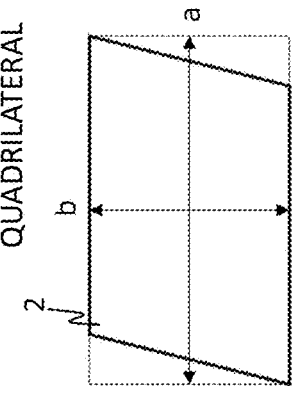
Fig.21C IN CASE OF ROUNDISH SHAPE
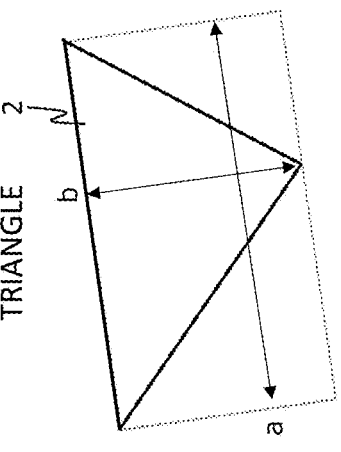
Fig.21D IN CASE OF ACTUAL FLAKY MAGNETIC METAL PARTICLES
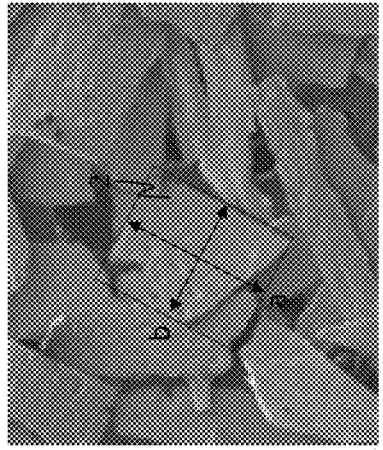
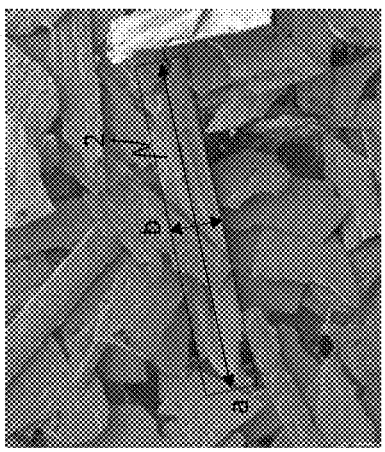
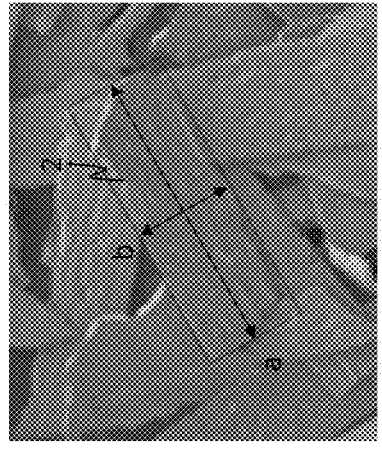

DIAGRAM AS VIEWED FROM TOP (FLAT SURFACE OF FLAKY MAGNETIC METAL PARTICLES)

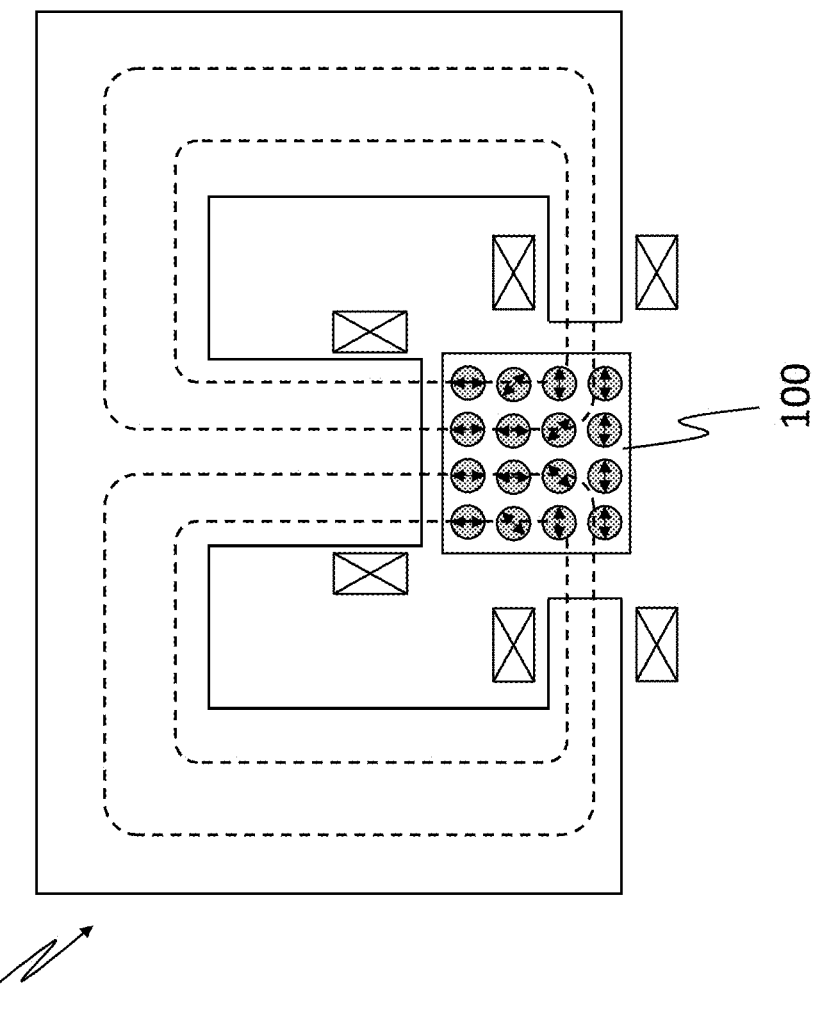
Fig.26 MAGNETIC FIELD GENERATOR

Fig.27

(LEFT) SINCE RATIO a/b OF MAXIMUM LENGTH a TO MINIMUM LENGTH b IN FLAT SURFACE IS CLOSE TO 1, EVEN IF PACKING RATIO IS HIGH, EASY MAGNETIZATION AXES IN FLAT SURFACES CAN BE ALIGNED ALONG PREDETERMINED CURVE (RIGHT) SINCE RATIO a/b OF MAXIMUM LENGTH a TO MINIMUM LENGTH b IN FLAT SURFACE IS LARGER THAN 3, WHEN PACKING RATIO BECOMES HIGH, ROTATION TO OTHER PARTICLES IS INHIBITED, AND IT IS DIFFICULT TO ALIGN EASY MAGNETIZATION AXES IN FLAT SURFACES ALONG PREDETERMINED CURVE

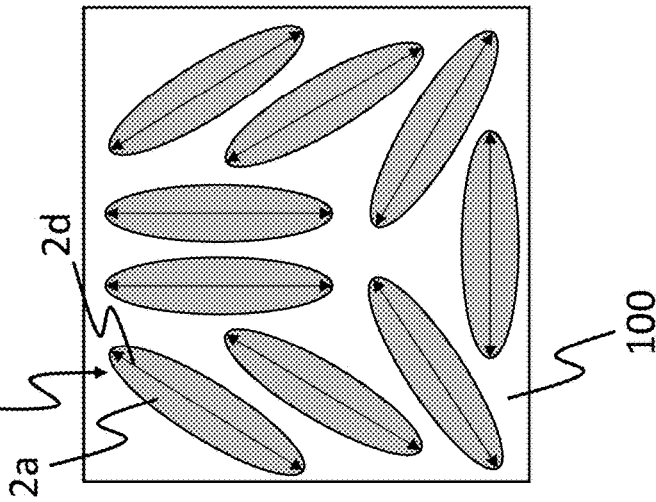

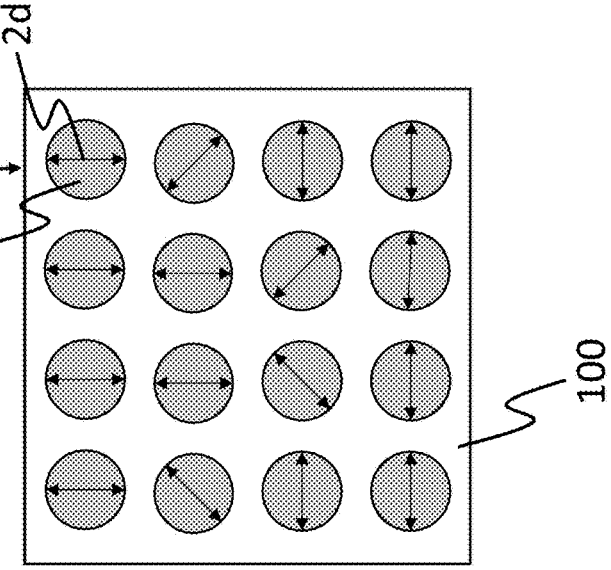

ROTATING ELECTRIC MACHINE

CROSS-REFERENCE TO RELATED APPLICATION

This application is based upon and claims the benefit of priority from Japanese Patent Application No. 2020-156171, filed on Sep. 17, 2020, the entire contents of which are incorporated herein by reference.

FIELD

Embodiments described herein relate generally to a rotating electric machine.

BACKGROUND

Rotating electric machines that are applicable to industrial equipment, vehicles, home electric appliances, and the like are heretofore known. These rotating electric machines usually comprise a core in which a plurality of silicon steel sheets are laminated in the axial direction, and which is configured such that magnetic flux flows along the steel sheet surfaces. On the other hand, in order to realize size reduction, torque increase, speed increase, efficiency increase, and the like, rotating electric machines having a structure in which the passage of magnetic flux (magnetic path) is three-dimensionally arranged have been proposed. Examples of rotating electric machines of this type include axial gap type machines and transverse flux type machines.

However, pressed powder materials used therein have inferior characteristics in view of saturation magnetization, magnetic permeability, losses, strength, toughness, and the like as compared to silicon steel sheets, and therefore, it is preferable to compensate for these shortcomings by devising the designs and production methods.

BRIEF DESCRIPTION OF THE DRAWINGS

FIG. 1 is a schematic diagram illustrating a rotating electric machine according to a first embodiment;

FIG. 5 is a schematic diagram illustrating a first disposition example of flaky magnetic metal particles in a first core of a rotor according to the first embodiment;

FIG. 6 is a schematic diagram illustrating a second disposition example of flaky magnetic metal particles in the first core of the rotor according to the first embodiment;

FIG. 7 is a schematic diagram illustrating a third disposition example of flaky magnetic metal particles in the first core of the rotor according to the first embodiment;

FIG. 20 is a conceptual diagram for describing a method for determining the maximum length and the minimum length in a flat surface of a flaky magnetic metal particle according to the first embodiment;

FIGS. 21A to 21D are conceptual diagrams for describing the method for determining the maximum length and the minimum length in a flat surface of a flaky magnetic metal particle according to the first embodiment;

FIG. 26 is a schematic diagram illustrating an example of a heat treatment in a magnetic field in a method for producing the pressed powder material according to the first embodiment;

FIG. 27 is a schematic diagram illustrating an operating effect for the method for producing the pressed powder material according to the first embodiment;

DETAILED DESCRIPTION

Figure 2B:
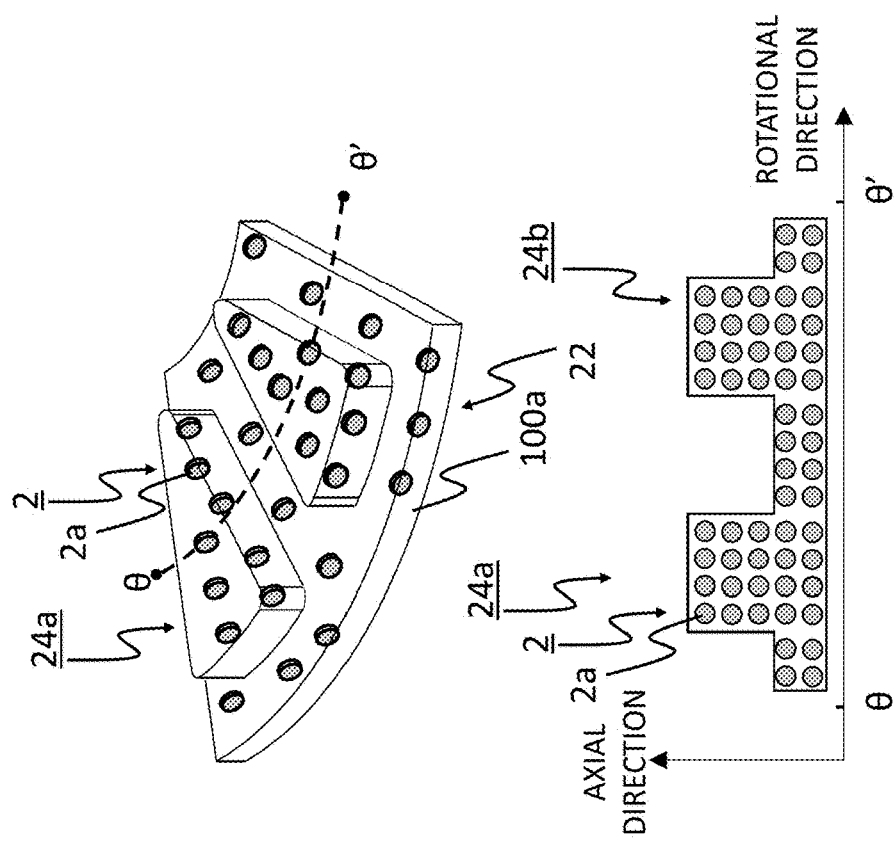
FIGS. 2A and 2B are schematic diagrams illustrating the rotating electric machine according to the first embodiment.

In the following description, embodiments will be described using the attached drawings. The following descriptions are to disclose specific examples of the contents of the embodiments, and the embodiments are not intended to be limited to these descriptions, while various modifications and corrections can be made by those ordinarily skilled in the art within the scope of the technical idea disclosed in the embodiments. Furthermore, in all the diagrams for describing the embodiments, an identical reference numeral will be assigned to identical or sites, and any overlapping description will not be repeated as appropriate.

In the present specification, the various directions of "axial direction", "rotational direction", and "radial direction" are defined on the basis of the rotor of a rotating electric machine. That is, the "axial direction" means a direction along the rotating shaft of the rotor, and the "rotational direction" means the direction of circumduction (or a tangential direction thereof) around the rotating shaft of the rotor. The "radial direction" means a direction orthogonally intersecting the rotating shaft of the rotor.

First Embodiment

A rotating electric machine of embodiments is a rotating electric machine comprising a rotor that includes a first core and is capable of rotating around a rotating shaft; and a stator disposed to face the rotor in the axial direction of the rotating shaft, the first core including a first pressed powder material including a plurality of first flaky magnetic metal particles and a first intercalated phase, the first flaky magnetic metal particles having an average thickness of from 10 nm to 100 μm, each of the first flaky magnetic metal particles having a first flat surface and a first magnetic metal phase including at least one first element selected from the group consisting of Fe, Co, and Ni, the average value of a ratio of the average length in the first flat surface with respect to the average thickness being from 5 to 10,000, the first intercalated phase existing between the first flaky magnetic metal particles and containing at least one second element selected from the group consisting of oxygen (O), carbon (C), nitrogen (N), and fluorine (F), wherein in the first pressed powder material, the first flat surfaces are oriented approximately in parallel with a first principal plane of the first pressed powder material, the first pressed powder material has the difference in magnetic permeability on the basis of direction within the first principal plane, and the first principal plane of the first pressed powder material is disposed to be approximately perpendicular to the radial direction of the rotating electric machine.

FIG. 1 is a schematic diagram of a rotating electric machine of the present embodiment. FIG. 1 shows a disposition example of flaky magnetic metal particles of a first core in a rotor. In FIG. 1, a rotating electric machine 200, a rotor 28, a supporting structure 42, first cores 22, a pressed powder material 100, a principal plane 102, flaky magnetic metal particles 2, flat surfaces 2a, a stator 30, coils 40, second cores 34, and a rotating shaft 26 are illustrated. In the diagram, the stator is illustrated as a structure in which coils are concentratedly wound around the second core; however, the stator is not limited to this and can be appropriately selected.

The rotating electric machine according to the present embodiment is an axial gap type rotating electric machine.

The rotor is composed of an appropriately cylindrical-shaped rotating shaft, a supporting structure integrally rotatably joined to the rotating axis, and first cores having the lateral part in the direction of rotation connected to the supporting structure.

Each first core includes a pressed powder material having a plurality of flaky magnetic metal particles and an intercalated phase as will be described below, and flat surfaces of the flaky magnetic metal particles are fixed to be approximately perpendicular to the radial direction. The direction of the flat surface can be easily adjusted by taking the principal plane of the pressed powder material as a reference by orienting the flat surface to be parallel with the principal plane. In this way, since the centrifugal force acting upon rotation is received at the flat surface, rigidity and toughness of the pressed powder material can be increased. That is, the rotor becomes robust, and speed increase of the rotating electric machine can be promoted. When viewed from a different angle, the structural supporting body can be suppressed to a minimal level, and size reduction and efficiency increase of the rotating electric machine can be promoted.

Meanwhile, according to the present specification, the term "approximately perpendicular" implies that some of the flaky magnetic metal particles may not be perpendicular; however, a half or more of the flat surfaces of the flaky magnetic metal particles is within the range of from 70° to 110°. Preferably, a half or more of the flat surfaces of the flaky magnetic metal particles is from 80° to 100°, and even more preferably, a half or more of the flat surfaces of the flaky magnetic metal particles is from 85° to 95°. As the flat surfaces are close to perpendicularity, a pressed powder material having excellent rigidity and toughness can be obtained. Furthermore, for example, the phrase "rotating electric machine in which the first principal plane of the first pressed powder material is disposed to be approximately perpendicular to the radial direction of the rotating electric machine" means a "rotating electric machine in which the first principal plane of the first pressed powder material is disposed to be within the range of from 80° to 100° with respect to the radial direction of the rotating electric machine".

According to the present specification, the phrase "in the pressed powder material, flat surfaces are oriented to be approximately parallel with the principal plane of the pressed powder material" implies that "in the pressed powder material, flat surfaces are oriented to be parallel or in an angle range within ±10° from being parallel with respect to the principal plane of the pressed powder material".

Figure 2A:
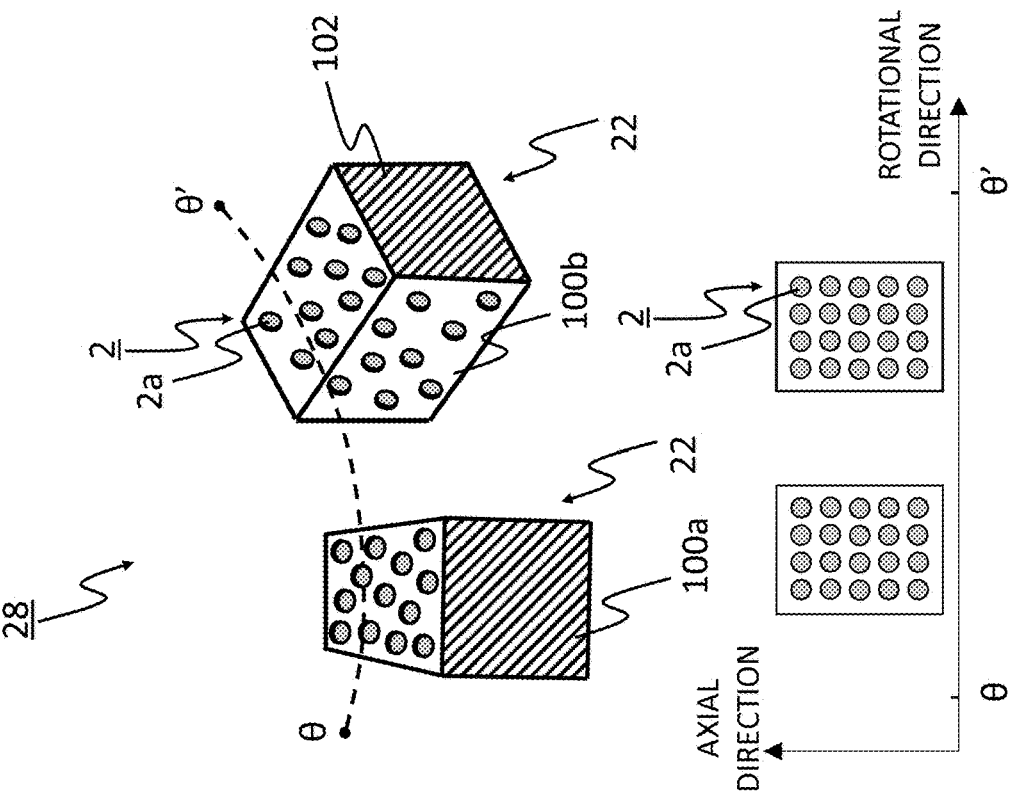

Furthermore, it is preferable that the first core has a plurality of magnetic salient pole parts formed therein, which are provided to be arranged at intervals in the rotational direction, as shown in FIGS. 2A and 2B. FIGS. 2A and 2B are schematic diagrams of the rotating electric machine according to the first embodiment. FIGS. 2A and 2B disclose an example of a rotor in which the first core forms a plurality of magnetic salient pole parts. By adopting such a configuration, a rotating electric machine capable of variable speed operation in a wide range up to high speed rotation can be provided. The first core may be formed of a pressed powder material only or may be formed by combining a pressed powder material, a silicon steel sheet, and the like. In FIGS. 2A and 2B, a rotor 28, first cores 22, a pressed powder material 100, a principal plane 102, flaky magnetic metal particles 2, flat surfaces 2a, and magnetic salient pole parts 24 are illustrated.

Figure 3:
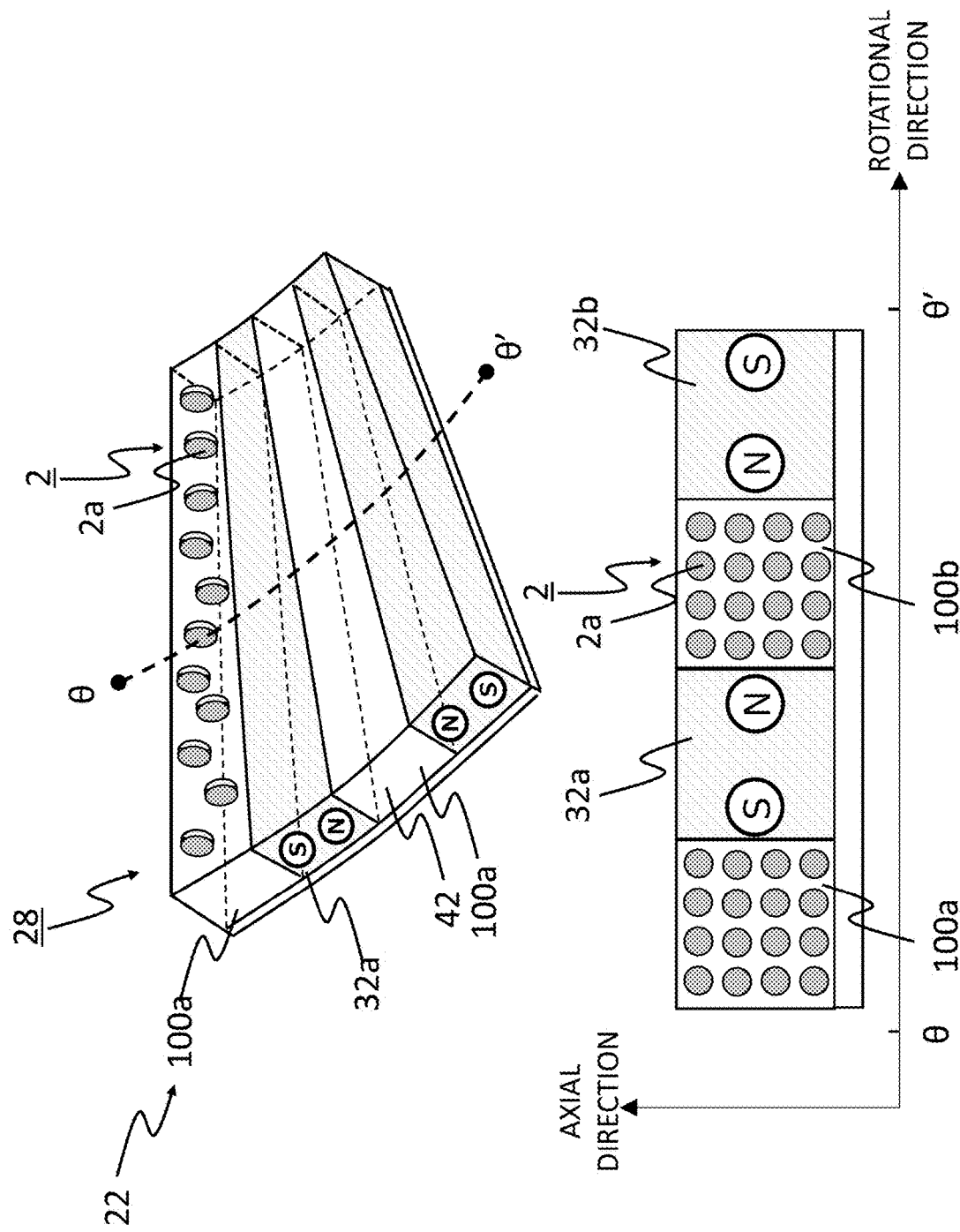
FIG. 3 is a schematic diagram illustrating another example of the rotating electric machine according to the first embodiment.

Furthermore, the rotor can adopt a configuration in which a plurality of first cores and a plurality of permanent magnets are alternately disposed in the rotational direction, as shown in FIG. 3. FIG. 3 is a schematic diagram of another example of the rotating electric machine according to the first embodiment. FIG. 3 is a modification example of the rotor. For example, the rotor has at least one or more first cores, and the first cores are disposed in contiguity with a plurality of permanent magnets arranged along the rotational direction of the rotor electric machine. For example, in the diagram of the rotating electric machine, it is said that a plurality of permanent magnets is magnetized in the rotational direction and is arranged such that the direction of magnetization becomes reversed between adjoining permanent magnets; however, the configuration is not limited to this, and the arrangement of the permanent magnets and the direction of magnetization can be appropriately selected. By adopting such a configuration, a highly efficiently rotating electric machine can be provided. In FIG. 3, a rotor 28, a supporting structure 42, a first core 22, a pressed powder material 100, flaky magnetic metal particles 2, flat surfaces 2a, and permanent magnets 32 are illustrated.

According to the present embodiment, since the yield strength of the pressed powder material against the centrifugal force or the like can be increased, speed increase is enabled with a minimal structural supporting body. In a case in which sufficient strength can be secured in a presumed circumstance of operation, it is also possible to directly join the first cores and the permanent magnets by adhesion, male-female fitting, or the like.

Figure 4B:
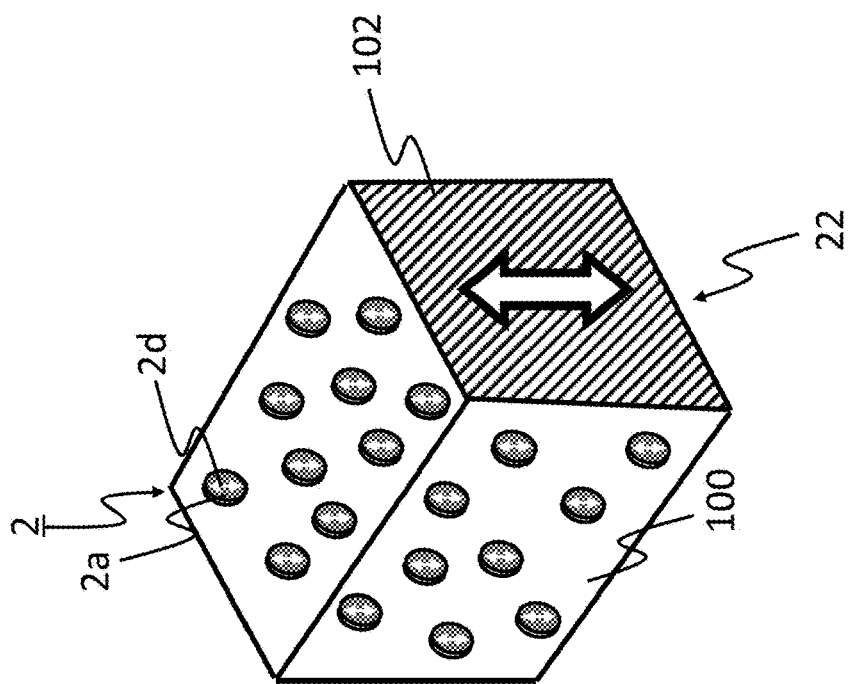
FIGS. 4A and 4B are schematic diagrams illustrating a pressed powder material in the rotating electric machine according to the first embodiment.
Figure 4A:
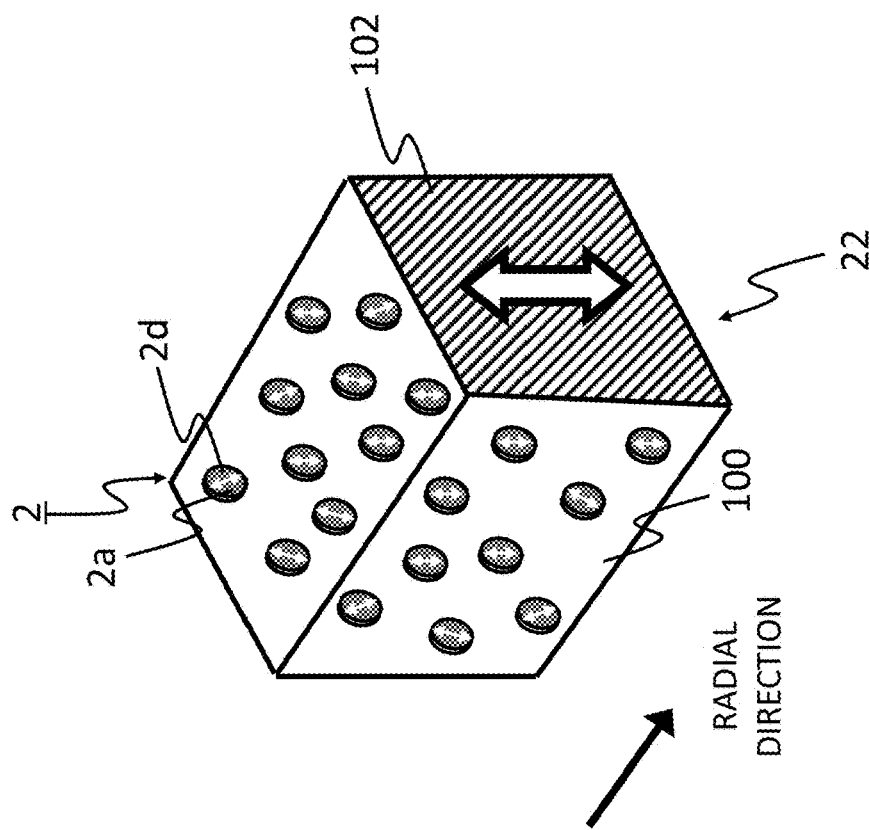

Furthermore, it is preferable that the pressed powder material exhibits magnetic anisotropy induced within the principal plane by a heat treatment in a magnetic field or the like. Thereby, the magnetic permeability in the axial direction can be increased, and a highly efficient rotating electric machine can be easily configured. FIGS. 4A and 4B are schematic diagrams of a pressed powder material in the rotating electric machine according to the first embodiment and illustrate an example of a pressed powder material in which magnetic anisotropy has been induced. The pressed powder material has an easy magnetization axis in one direction within the principal plane as a sum of the properties of a plurality of flaky magnetic metal particles included in the internal part. The arrows drawn in the principal plane of the pressed powder material and the flat surfaces of the flaky magnetic metal particles in the diagram indicate the direction in which the respective magnetic permeabilities become the highest (directions of the easy magnetization axis). FIG. 4A shows a case in which the first core has an easy magnetization axis and faces a predetermined direction. FIG. 4B further shows a case in which the easy magnetization axes of individual flaky magnetic metal particles are aligned in a predetermined direction. As shown in FIG. 4B, as the easy magnetization axes of individual flaky magnetic metal particles are more effectively aligned, the magnetic permeability in the axial direction can be increased, which is preferable. In FIGS. 4A and 4B, first cores 22, a pressed powder material 100, a principal plane 102, flaky magnetic metal particles 2, flat surfaces 2a, and easy magnetization axes 2d are illustrated.

FIG. 5 is a schematic diagram illustrating a first disposition example of flaky magnetic metal particles in the first core of the rotor according to the first embodiment. FIG. 5 is a first disposition example in a direction in which the magnetic permeability becomes the highest within the flat surfaces of individual flaky magnetic metal particles of the first core. FIG. 5 is a schematic diagram in which a desired direction of the easy magnetization axes of the flaky magnetic metal particles in the rotating electric machine according to the present embodiment is spread and displayed on Cartesian coordinates of the rotational direction and the axial direction. From the viewpoint of increasing the magnetic permeability in the axial direction, it is preferable for the pressed powder material that the easy magnetization axis in the principal plane faces the axial direction, and it is more preferable that as shown in the same diagram, the easy magnetization axes of a plurality of flaky magnetic metal particles included in the internal part are aligned in the axial direction. In other words, it is preferable that the direction in which the magnetic permeability within the principal plane of the pressed powder material becomes the highest is aligned to be approximately parallel with the axial direction of the rotating electric machine. Here, the phrase "the direction in which the magnetic permeability within the principal plane of the pressed powder material becomes the highest is approximately parallel with the axial direction of the rotating electric machine" implies that, for example, "the direction in which the magnetic permeability within the principal plane of the pressed powder material becomes the highest is parallel with the axial direction of the rotating electric machine or in the range within ±10° from the axial direction of the rotating electric machine". At this time, the magnetic permeability in the axial direction becomes the highest. In FIG. 5, a pressed powder material 100, flaky magnetic metal particles, flat surfaces 2a, and an easy magnetization axis 2d are illustrated.

Furthermore, it is preferable that the easy magnetization axes (direction in which the magnetic permeability becomes the highest) of individual flaky magnetic metal particles are aligned along the flow of the magnetic flux inside the first core. Here, such a flow of the magnetic flux can be visualized and analyzed using, for example, electromagnetic field analysis software such as ANSYS or JMAG. This configuration is schematically illustrated in FIG. 6 in order to make the configuration easily understandable. FIG. 6 is a schematic diagram illustrating a second disposition example of flaky magnetic metal particles in the first core of the rotor according to the first embodiment. FIG. 6 illustrates the second disposition example in a direction in which the magnetic permeability becomes the highest within the flat surfaces of individual flaky magnetic metal particles of the first core. Broken lines (D in the diagram represent the flow of magnetic flux (predetermined curve). By adopting such a configuration, the flow of magnetic flux can be controlled, and a rotating electric machine that is even more highly efficient can be provided. Furthermore, in order to enable the first core that has been dividedly produced to be shaped into an integrated shape, the number of component parts and the number of processes can be reduced. In addition, it is preferable to make the second core similar to the first core.

Whether the easy magnetization axes of the flaky magnetic metal particles are aligned along a predetermined curve is judged by determining the direction of the easy magnetization axis by the measurement method that will be described below for a plurality of specimens cut out from a single pressed powder material and measuring a change in the angle with respect to the direction of the rotating shaft. FIG. 6 shows an example in which the angle with respect to the axial direction changes 180° and an example in which the angle changes 90°; however, the embodiments are not limited to this, and when the angle with respect to the axial direction changes 5° or more, the easy magnetization axes of the flaky magnetic metal particles are regarded to be aligned along a predetermined curve. In FIG. 6, magnetic salient pole parts (teeth parts) 24, connection parts (yoke parts) 44, flaky magnetic metal particles 2, flat surfaces 2a, permanent magnets 32, and a pressed powder material 100 are illustrated.

It is also possible to integrate a plurality of pressed powder materials having easy magnetization axes in one direction within a principal plane. Thereby, it is easy to configure the first core according to the flow of magnetic flux. FIG. 7 is a schematic diagram illustrating a third disposition example of flaky magnetic metal particles in the first core of the rotor of the first embodiment. FIG. 7 shows the third disposition example in a direction in which the magnetic permeability within the flat surfaces of individual flaky magnetic metal particles of the first core becomes the highest. As shown in FIG. 7, in a case in which the first core is composed of magnetic salient pole parts (teeth parts) and connection parts (yoke parts) connecting between the magnetic salient poles, it is preferable that the directions of easy magnetization axes (direction in which the magnetic permeability becomes the highest) in the principal plane are respectively aligned with the axial direction at the magnetic salient pole parts (teeth parts) and with the rotational direction at the connection parts (yoke parts). Furthermore, it is preferable that the easy magnetization axes of the magnetic salient pole parts (teeth parts) in the vicinity of a plane facing the stator are approximately parallel with the axial direction of the rotor. Furthermore, it is preferable that at the yoke parts separated apart from the teeth parts, the rotational direction of the rotating electric machine and the direction in which the magnetic permeability within the principal plane of a first pressed powder material becomes the highest are aligned. Here, the phrase "the easy magnetization axes of the teeth parts in the vicinity of a plane facing the stator are approximately parallel with the axial direction of the rotor" implies that "the easy magnetization axes of the teeth parts in the vicinity of a plane facing the stator are parallel with the axial direction of the rotor or in an angle range within ±10° from the axial direction of the rotor".

In FIG. 7, magnetic salient pole parts (teeth parts) 36, planes of magnetic salient pole parts (teeth parts) facing the stator 37, connection parts (yoke parts) 38, flaky magnetic metal particles 2, flat surfaces 2a, and easy magnetization axes 2d are illustrated.

Figure 8:
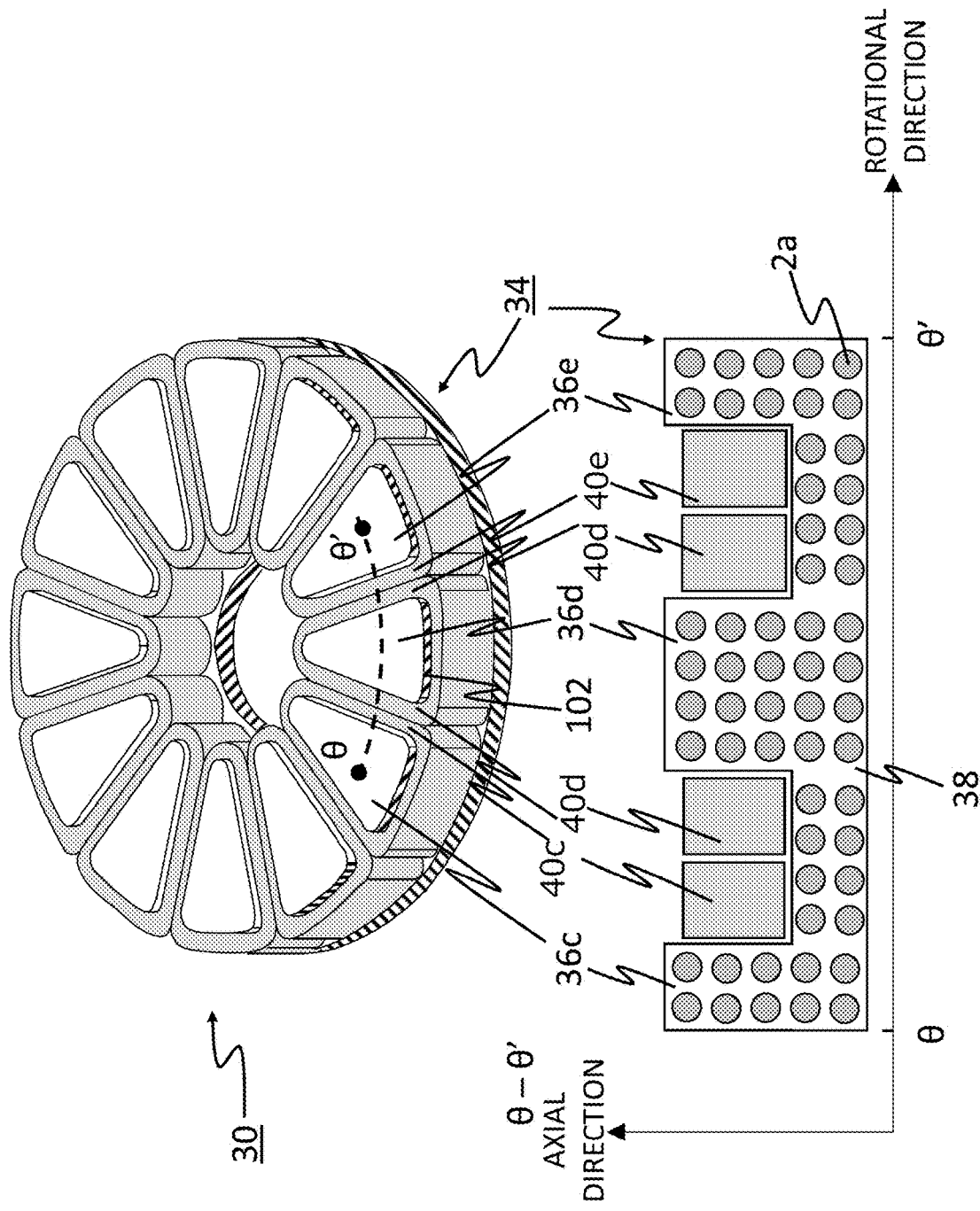
FIG. 8 is a schematic diagram illustrating a disposition example of flaky magnetic metal particles in a second core of a stator according to the first embodiment.

Furthermore, the rotating electric machine according to the present embodiment is a rotating electric machine comprising a rotor that is capable of rotating around a rotating shaft; and a stator that is disposed to face the rotor in the axial direction of the rotating shaft and includes a second core and coils wound around the second core, the second core includes a second pressed powder material having a plurality of second flaky magnetic metal particles and a second intercalated phase, the second flaky magnetic metal particles having an average thickness of from 10 nm to 100 µm, each of the second flaky magnetic metal particles having a second flat surface and a second magnetic metal phase including at least one first element selected from the group consisting of Fe, Co, and Ni, the average value of the ratio of the average length in the second flat surface with respect to the average thickness being from 5 to 10,000, the second intercalated phase existing between the second flaky magnetic metal particles and including at least one second element selected from the group consisting of O, C, N, and F, and in the second pressed powder material, the second flat surfaces are oriented approximately in parallel with a second principal plane of the second pressed powder material and have the difference in magnetic permeability on the basis of direction within the second principal plane, while the second principal plane of the second pressed powder material is disposed to be approximately perpendicular to the radial direction of the rotating electric machine. This configuration is schematically illustrated in FIG. 8 in order to make the configuration easily understandable. FIG. 8 is a schematic diagram illustrating the rotating electric machine according to the present embodiment. FIG. 8 illustrates a disposition example of flaky magnetic metal particles of the second core in a stator according to the present embodiment. Teeth parts 36 are provided on yoke parts 38. In the upper diagram of FIG. 8, twelve teeth parts 36 are illustrated. The teeth parts 36 and the yoke parts 38 may be integrally molded and formed. Furthermore, it is also acceptable that the teeth parts 36 and the yoke parts 38 are individually formed, and the teeth parts 36 and the yoke parts 38 are joined later. Each of the teeth parts 36 is wound with a core 40. In the lower diagram of FIG. 8, a θ-θ' cross-section of the upper diagram of FIG. 8 is illustrated. Yoke parts 38, and a teeth part 36c, a teeth part 36d, and a teeth part 36e provided on the yoke parts 38 are illustrated. A coil 40c is wound around the teeth part 36c. A coil 40d is wound around the teeth part 36d. A coil 40e is wound around the teeth part 36e. Each of the teeth parts 36 is provided with a principal plane 102. In FIG. 8, the principal planes 102 of the teeth parts 36 are provided.

The configuration of the rotor is not particularly limited and may have a function of configuring an axial gap type rotating electric machine. Furthermore, it is also possible to configure a rotating electric machine in combination with the above-described rotor.

By adopting such a configuration, magnetic flux flows in a direction parallel to the flat surfaces of the flaky magnetic particles, and therefore, an eddy current loss can be reduced. Furthermore, since the magnetic permeability of the second core can be enhanced, high torque can be obtained. In addition, since the strength of the pressed powder material can be increased, a robust stator can be provided.

Furthermore, the pressed powder material is preferably such that the easy magnetization axes of the flaky magnetic metal particles are aligned in a predetermined single direction. Moreover, it is preferable that the easy magnetization axes are formed along a predetermined curve by sequentially changing the angle with respect to the axial direction.

Furthermore, as shown in FIG. 7, it is preferable that the easy magnetization axes are formed such that the directions of the easy magnetic axes are respectively aligned with the axial direction at the teeth parts and with the rotational direction at the yoke parts. Thereby, high torque can be realized, and efficiency increase can be promoted.

Next, the effects according to the present embodiment will be described.

Example is a pressed powder material comprising a plurality of flaky magnetic metal particles and an intercalated phase as will be described.

Comparative Example 1 is a pressed powder material obtained by compression molding insulation-coated approximately spherical-shaped Fe particles. Comparative Example 2 is a pressed powder material obtained by compression molding Fe particles having a large shape aspect ratio (=major axis/minor axis), in which the major axis directions are oriented in one direction.

As an example of a sheet-shaped or ribbon-shaped material, which is not a pressed powder material, comparison is made with a laminated material (Comparative Example 3) obtained by stacking non-directional silicon steel sheets and laminated material (Comparative Example 4) obtained by stacking directional silicon steel sheets.

With regard to the samples for evaluation of Example and Comparative Examples 1 to 4, magnetic permeability and strength are evaluated by the following methods. The evaluation results are expressed as ratios on the basis of the results of Comparative Example 1.

(1) Magnetic permeability: A closed magnetic path having a sample for evaluation interposed between a yoke is formed, and the amplitude permeability is measured at a frequency of 400 Hz. The direction of the sample with respect to the yoke is rotated 90°, and similar measurement is repeated.

(2) Strength: The flexural strength of the sample for evaluation is measured by a three-point bending test. The direction of load is changed, and similar measurement is repeated.

Figure 9:
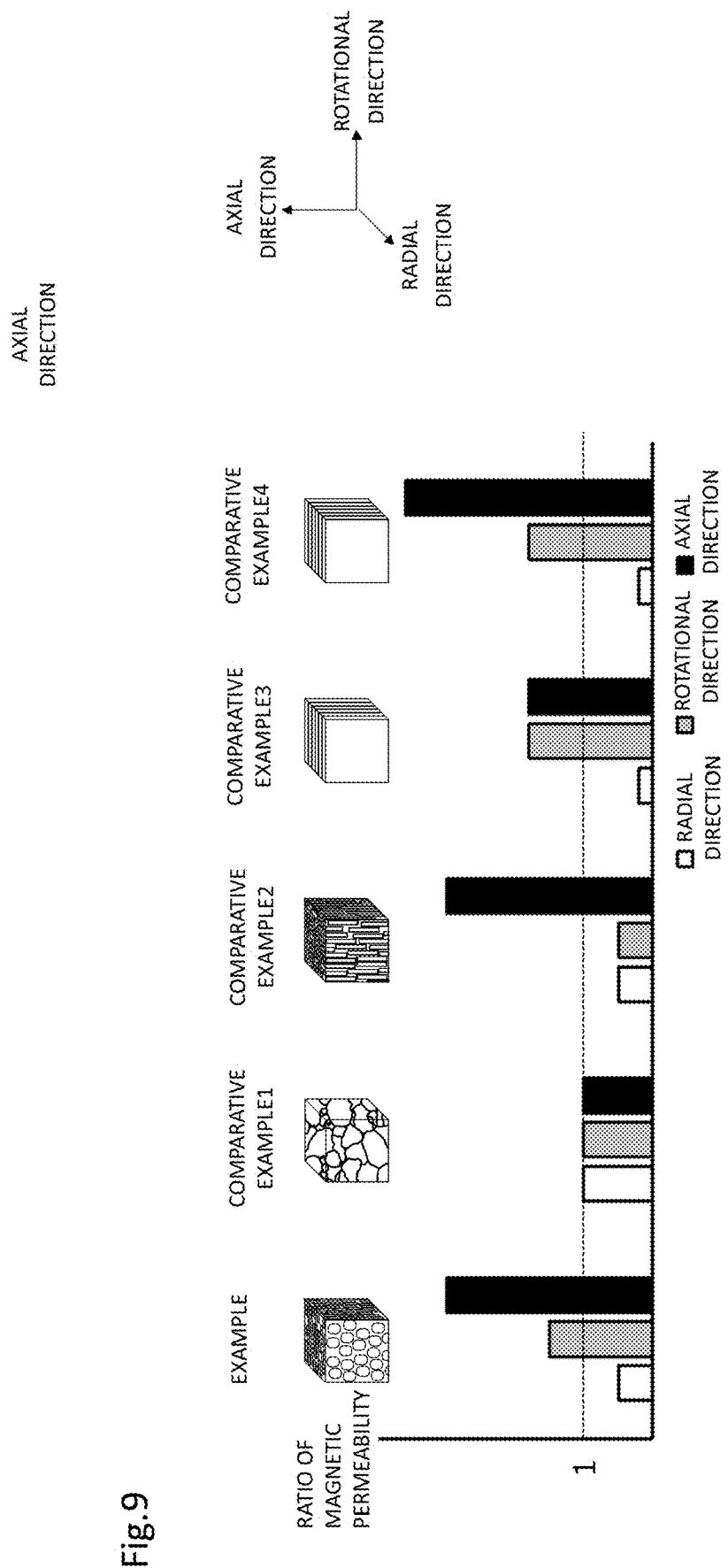
FIG. 9 is a schematic diagram illustrating the operating effect according to the first embodiment.

FIG. 9 shows evaluation results for magnetic permeability. In order to directly apply the above-given descriptions, the change in the magnetic permeability on the basis of direction is indicated by designating the direction in which the magnetic permeability becomes the highest, as the axial direction.

Figure 10:
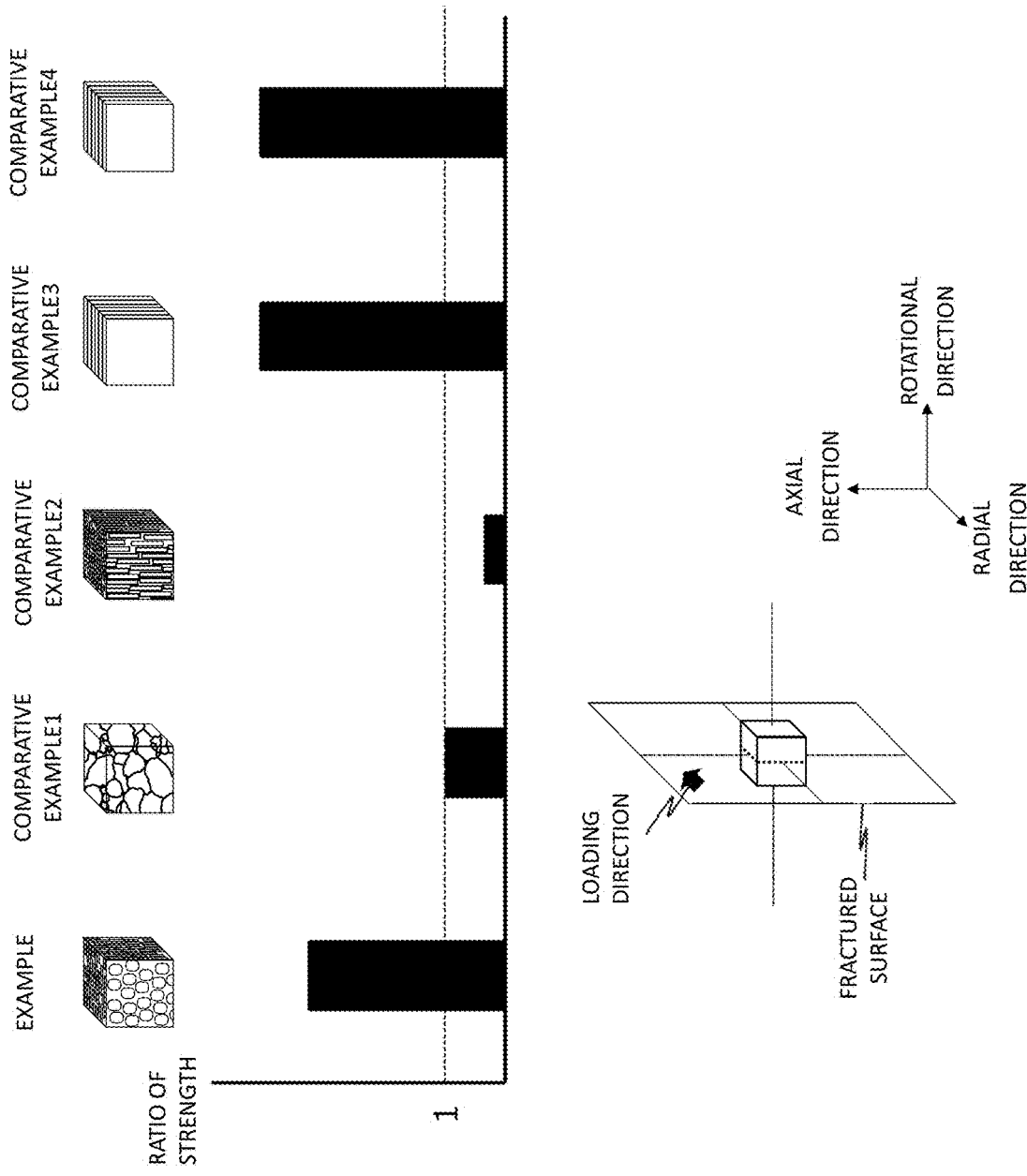
FIG. 10 is a first schematic diagram illustrating the operating effect according to the first embodiment.

FIG. 10 shows the evaluation results for strength. Assuming the configuration of the rotor shown in FIG. 1, the strength at the time of supporting the end faces in the rotational direction is collectively shown.

As is obvious from FIG. 9 and FIG. 10, it is understood that the pressed power material of Example has the difference in magnetic permeability on the basis of direction within the principal plane, and that the magnetic permeability in the axial direction can be increased as compared to the pressed powder material of Comparative Example 1. Furthermore, regarding Comparative Example 2, it is understood that the magnetic permeability in the axial direction can be adjusted to the same level as that of Example 1; however, strength is inferior. The pressed powder material of Example is also weak under a load in the direction along the flat surface of a flaky magnetic particle; however, the pressed powder material can be reinforced as a supporting structure or a permanent magnet.

Figure 11:
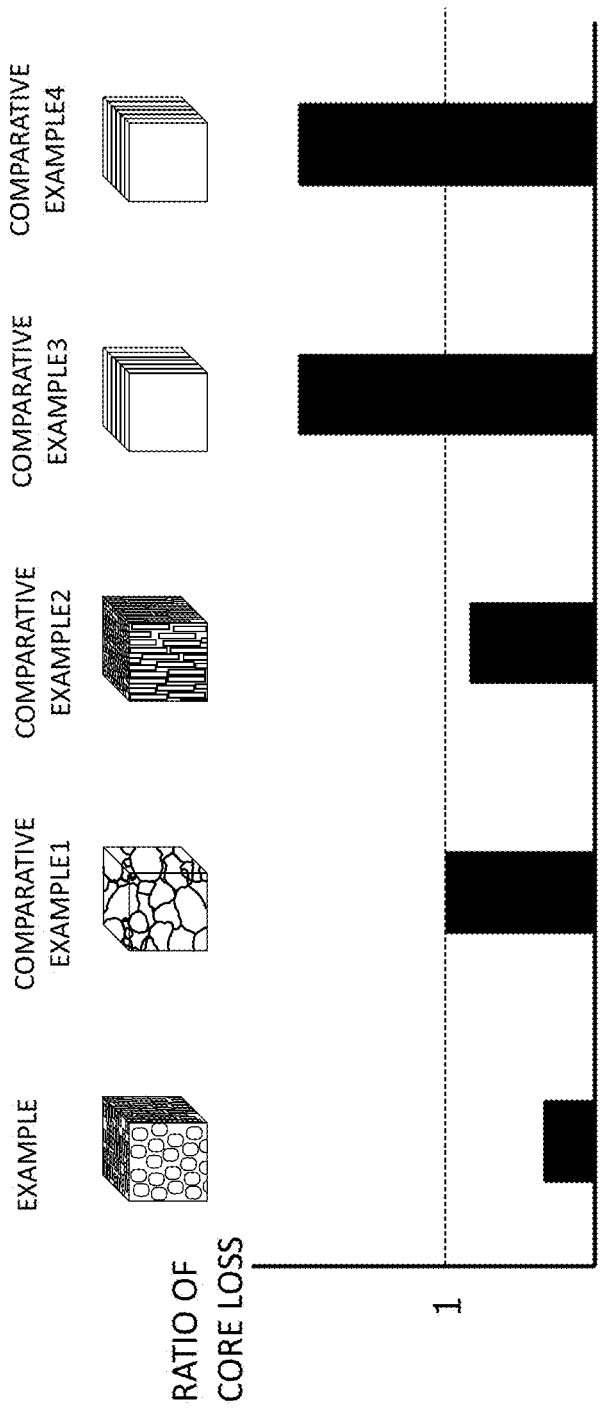
FIG. 11 is a second schematic diagram illustrating the operating effect according to the first embodiment.

Here, with regard to the rotating electric machine according to the present embodiment as an example, the values of core loss at the time of applying the Example and Comparative Examples 1 to 4 to sites where the magnetic flux flowed three-dimensionally and the direction of flow changed moment by moment were determined using electromagnetic field analysis software. The evaluation results are presented in FIG. 11. As is obvious from FIG. 11, it is understood that the pressed powder material of Example can reduce the core loss more effectively than Comparative Example 1 and Comparative Example 2. Furthermore, it is understood from FIG. 9 to FIG. 11 that the laminated materials of Comparative Example 3 and Comparative Example 4 are excellent from the viewpoints of both magnetic permeability and strength as compared to the pressed powder material of Example; however, since a large eddy current loss occurs in a magnetic field in the direction of lamination, the laminated materials of the Comparative Examples are slightly inferior from the viewpoint of core loss.

As described above, according to the present embodiment, a high-performance rotating electric machine can be configured by enhancing both the strength and magnetic permeability of the pressed powder material.

(Pressed Powder Material)

Next, the pressed powder material according to the present embodiment will be described in detail.

The flaky magnetic metal particles are flaky particles (flattened particles) having a flaky shape (flattened shape), and each flaky magnetic metal particle has a flat surface and a magnetic metal phase including at least one first element selected from the group consisting of Fe, Co, and Ni.

The crystal grain size of the magnetic metal phase is preferably 10 nm or less. The crystal grain size is more preferably 5 nm or less, and even more preferably 2 nm or less. Incidentally, the crystal grain size can be conveniently determined from X-ray diffraction (XRD) measurement. That is, in relation to the most intense peak among the peaks attributable to the magnetic metal phase in XRD, the crystal grain size can be determined by the Scherrer equation from the diffraction angle and the full width at half maximum. The Scherrer equation is represented by $D=0.9 \lambda/(\beta \cos \theta)$, wherein D represents the crystal grain size; $\lambda$ represents the X-ray wavelength for measurement; $\beta$ represents the full width at half maximum; and $\theta$ represents the diffraction Bragg's angle. Furthermore, the crystal grain size can also be determined by making observation of a large number of magnetic metal phases by a transmission electron microscope (TEM) and averaging the particle sizes of the magnetic metal phases. In a case in which the crystal grain size is small, it is preferable to determine the crystal grain size by XRD measurement, and in a case in which the crystal grain size is large, it is preferable to determine the crystal grain size by TEM observation. However, it is preferable to select the measurement method according to the circumstances, or to use the two methods in combination and determine the crystal grain size in a comprehensive manner. The crystal grain size of the magnetic metal phase that can be determined by XRD measurement or TEM observation is preferably 10 nm or less, more preferably 5 nm or less, and even more preferably 2 nm or less. Thereby, magnetic anisotropy is easily induced, and the difference in magnetic permeability within the flat surface increases, which is preferable. Furthermore, since a smaller crystal grain size means that the substance is closer to amorphousness, electrical resistance is increased compared to highly crystalline substances, and thereby the eddy current loss is likely to be reduced, which is preferable. Also, it is preferable because the magnetic metal phase is excellent in terms of corrosion resistance and oxidation resistance as compared to highly crystalline substances.

It is preferable that the magnetic metal phase includes at least one additive element selected from the group consisting of B, Si, Al, C, Ti, Zr, Hf, Nb, Ta, Mo, Cr, Cu, W, P, N, Ga, and Y. Thereby, amorphization proceeds, magnetic anisotropy is easily induced, and the difference in coercivity within the flat surface increases, which is preferable. An additive element having a large difference in the atomic radius from at least one first element selected from the group consisting of Fe, Co, and Ni is preferred. Furthermore, an additive element whose enthalpy of mixing between at least one first element selected from the group consisting of Fe, Co, and Ni and the additive element acquires a larger negative value, is preferred. It is also preferable that the flaky magnetic metal particles are formed from a multicomponent system composed of three or more kinds of elements in total, including a first element and an additive element. It is advantageous to mix semi-metal additive elements such as B and Si into the system because the semi-metal additive elements have slow rates of crystallization and are easily amorphized. From the viewpoint such as described above, B, Si, P, Ti, Zr, Hf, Nb, Y, Cu, and the like are preferred, and above all, it is more preferable that the additive elements include any one of B, Si, Zr, and Y. It is also preferable that the total amount of the additive element is from 0.001 at % to 80 at % in total with respect to the total amount of the first element and the additive element. The total amount is more preferably from 5 at % to 80 at %, and even more preferably from 10 at % to 40 at %. As the total amount of the additive element is larger, amorphization proceeds, and magnetic anisotropy is easily induced, which is preferable (that is, it is preferable from the viewpoints of low loss and high magnetic permeability); however, on the other hand, since the proportion of the magnetic metal phase becomes smaller, it is not preferable from the viewpoint that saturation magnetization is decreased.

With regard to the flaky magnetic metal particles, the first element includes Fe and Co, and the amount of Co is preferably from 10 at % to 60 at %, and more preferably from 10 at % to 40 at %, with respect to the total amount of Fe and Co. Thereby, appropriately high magnetic anisotropy is likely to be induced, and the above-described magnetic characteristics are enhanced, which is therefore preferable. Furthermore, an Fe—Co system is preferred because high saturation magnetization can be easily realized. Furthermore, when the composition range of Fe and Co is included in the above-described range, higher saturation magnetization can be realized, which is preferable.

It is preferable that the flaky magnetic metal particles contain at least one non-magnetic metal selected from the group consisting of Mg, Al, Si, Ca, Zr, Ti, Hf, Zn, Mn, Ba, Sr, Cr, Mo, Ag, Ga, Sc, V, Y, Nb, Pb, Cu, In, Sn, and rare earth elements. Thereby, the thermal stability and oxidation resistance of the flaky magnetic metal particles can be enhanced. Among them, Al and Si are particularly preferred because these elements can easily form solid solutions with Fe, Co, and Ni, which are main components of the flaky magnetic metal particles and contribute to enhancement of thermal stability and oxidation resistance.

It is preferable that the flaky magnetic metal particles include Fe and Co and have a portion having a crystal structure of the body-centered cubic structure (bcc). Thereby, appropriately high magnetic anisotropy can be easily induced, and the above-mentioned magnetic characteristics are enhanced, which is therefore preferable. Also, with a "crystal structure of a mixed phase of bcc and face-centered cubic (fcc)", which partially has the fcc crystal structure, appropriately high magnetic anisotropy can be easily induced, and the above-mentioned magnetic characteristics are enhanced, which is therefore preferable.

It is preferable that the flat surface is crystallographically oriented. The direction of orientation is preferably the (110) plane orientation or the (111) plane orientation; however, the direction of orientation is more preferably the (110) plane orientation. In a case in which the crystal structure of the flaky magnetic metal particles is the body-centered cubic structure (bcc), the (110) plane orientation is preferred, and in a case in which the crystal structure of the flaky magnetic metal particles is the face-centered cubic structure (fcc), the (111) plane orientation is preferred. Thereby, appropriately high magnetic anisotropy can be easily induced, and the above-mentioned magnetic characteristics are enhanced, which is therefore preferable.

Furthermore, regarding a more preferred direction of orientation, the (110)[111] direction and the (111)[110] direction are preferred; however, more preferred is the (110)[111] direction. In a case in which the crystal structure of a flaky magnetic metal particle is the body-centered cubic structure (bcc), orientation in the (110)[111] direction is preferred, and in a case in which the crystal structure of a flaky magnetic metal particle is the face-centered cubic structure (fcc), orientation in the (111) [110] direction is preferred. Thereby, appropriately high magnetic anisotropy is easily induced, and the above-described magnetic characteristics are enhanced, which is therefore preferable. Furthermore, according to the present specification, the "(110) [111] direction" refers to a direction in which the slip plane is the (110) plane or a plane crystallographically equivalent thereto, that is, the {110} plane, and the slip direction is the [111] direction or a direction crystallographically equivalent thereto, that is, the <111> direction. The same also applies to the (111) [110] direction. That is, the (111) [110] direction refers to a direction in which the slip plane is the (111) plane or a plane crystallographically equivalent thereto, that is, the {111} plane, and the slip direction is the [110] direction or a direction crystallographically equivalent thereto, that is, the <110> direction.

The lattice strain of the flaky magnetic metal particles is preferably from 0.01% to 10%, more preferably from 0.01% to 5%, even more preferably from 0.01% to 1%, and still more preferably from 0.01% to 0.5%. Thereby, appropriately high magnetic anisotropy can be easily induced, and the above-described magnetic characteristics are enhanced, which is therefore preferable.

Meanwhile, the lattice strain can be calculated by analyzing in detail the line widths obtainable by X-ray diffraction (XRD). That is, by drawing a Halder-Wagner plot or a Hall-Williamson plot, the extent of contribution made by expansion of the line width can be separated into the crystal grain size and the lattice strain. The lattice strain can be calculated thereby. A Halder-Wagner plot is preferable from the viewpoint of reliability. In regard to the Halder-Wagner plot, for example, N. C. Halder, C. N. J. Wagner, Acta Cryst., 20 (1966), 312-313 may be referred to. Here, a Halder-Wagner plot is represented by the following expression:

$$\frac{\beta^2}{\tan^2\theta} = \frac{K\lambda}{D}\frac{\beta}{\tan\theta\sin\theta} + 16\varepsilon^2, \varepsilon = \varepsilon_{max} = \frac{\sqrt{2\pi}}{2}\sqrt{\overline{\varepsilon^2}} \qquad [\text{Math. 1}]$$

($\beta$: integrated width, K: constant, $\lambda$: wavelength, D: crystal grain size, $\sqrt{\overline{\varepsilon^2}}$: lattice strain (root-mean-square))

That is, $\beta^2/\tan^2 \theta$ is plotted on the vertical axis, and $\beta/\tan \theta \sin \theta$ is plotted on the horizontal axis. The crystal grain size D is calculated from the gradient of the approximation straight line of the plot, and the lattice strain c is calculated from the ordinate intercept. When the lattice strain obtained by a Halder-Wagner plot of the expression described above (lattice strain (root-mean-square)) is from 0.01% to 10%, more preferably from 0.01% to 5%, even more preferably from 0.01% to 1%, and still more preferably from 0.01% to 0.5%, appropriately high magnetic anisotropy can be easily induced, and the above-described magnetic characteristics are enhanced, which is therefore preferable.

The lattice strain analysis described above is a technique that is effective in a case in which a plurality of peaks can be detected by XRD; however, on the other hand, in a case in which the peak intensities in XRD are weak, and there are few peaks that can be detected (for example, when only one peak is detected), it is difficult to perform an analysis. In such a case, it is preferable to calculate the lattice strain by the following procedure. First, the composition is determined by high-frequency inductively coupled plasma (ICP) emission spectroscopy, energy dispersive X-ray spectroscopy (EDX), or the like, and the composition ratio of three magnetic metal elements, namely, Fe, Co and Ni, is calculated (in a case in which there are only two magnetic metal elements, the composition ratio of two elements; in a case in which there is only one magnetic metal element, the composition ratio of one element (=100%)). Next, an ideal lattice spacing $d_0$ is calculated from the composition of Fe—Co—Ni (refer to the values published in the literature, or the like. In some cases, an alloy having the composition is produced, and the lattice spacing is calculated by making a measurement). Subsequently, the amount of strain can be determined by determining the difference between the lattice spacing d of the peaks of an analyzed sample and the ideal lattice spacing do. That is, in this case, the amount of strain is calculated by the expression: $(d-d_0)/d_0 \times 100$ (%). Thus, in regard to the analysis of the lattice strain, it is preferable to use the two above-described techniques appropriately depending on the state of peak intensity, and depending on cases, it is preferable to evaluate the lattice strain by using the two techniques in combination.

The lattice spacing in the flat surface varies depending on the direction, and the proportion of the difference between the maximum lattice spacing $d_{max}$ and the minimum lattice spacing $d_{min}(=(d_{max}-d_{min})/d_{min}\times100\ (\%))$ is preferably from 0.01% to 10%, more preferably from 0.01% to 5%, even more preferably from 0.01% to 1%, and still more preferably from 0.01% to 0.5%. Thereby, appropriately high magnetic anisotropy can be easily induced, and the above-described magnetic characteristics are enhanced, which is therefore preferable. Furthermore, the lattice spacing can be conveniently determined by an XRD measurement. When this XRD measurement is carried out while the direction is varied within a plane, the differences in the lattice constant depending on the direction can be determined.

In regard to crystallites of the flaky magnetic metal particles, it is preferable that either the crystallites are unidirectionally linked in a row within the flat surface, or the crystallites are rod-shaped and are unidirectionally oriented in the flat surface. Thereby, appropriately high magnetic anisotropy can be easily induced, and the above-described magnetic characteristics are enhanced, which is therefore preferable.

It is preferable that the flat surface of a flaky magnetic metal particle has either or both of a plurality of concavities and a plurality of convexities, the concavities and the convexities being arranged in a first direction and each of the concavities and the convexities having a width of 0.1 μm or more, a length of 1 μm or more, and an aspect ratio of 2 or higher. Thereby, magnetic anisotropy is easily induced in the first direction, and the difference in coercivity on the basis of direction within the flat surface is increased, which is preferable. From this point of view, it is more preferable that the width is 1 μm or more and the length is 10 μm or more. The aspect ratio is preferably 5 or higher, and more preferably 10 or higher. Furthermore, by including such concavities or convexities, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles), and thereby, thermal stability and mechanical characteristics such as strength and hardness are enhanced. Therefore, it is preferable.

Figure 12:
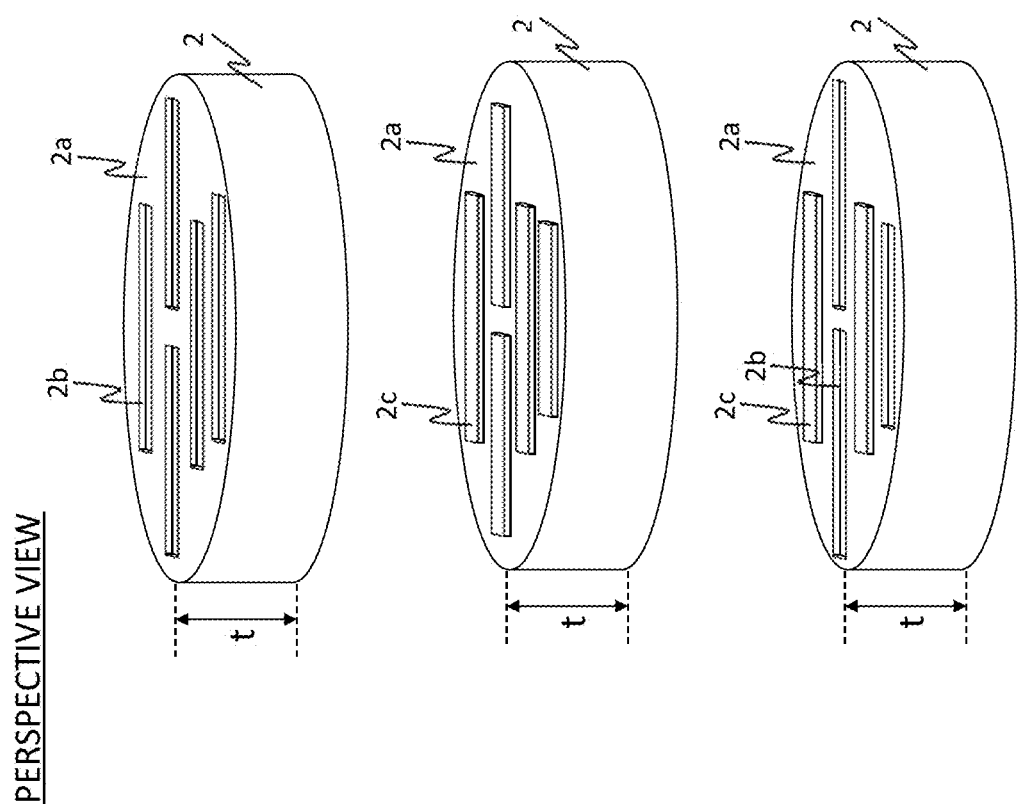
FIG. 12 is a schematic perspective view of flaky magnetic metal particles in the pressed powder material according to the first embodiment.
Figure 13:
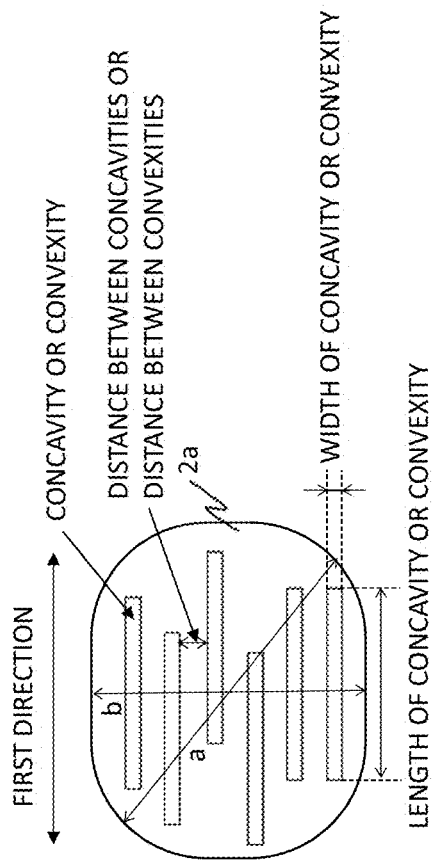
FIG. 13 is a schematic diagram illustrating the case of viewing a flaky magnetic metal particle from above in the pressed powder material according to the first embodiment.

FIG. 12 and FIG. 13 are schematic diagrams illustrating the flaky magnetic metal particles according to the present embodiment. FIG. 12 is a schematic perspective view of the flaky magnetic metal particles according to the present embodiment. Meanwhile, in the upper diagram of FIG. 12, only concavities are provided, and in the middle diagram of FIG. 12, only convexities are provided; however, one flaky magnetic metal particle may have both concavities and convexities as shown in the lower diagram of FIG. 12. FIG. 13 is a schematic diagram illustrating a flaky magnetic metal particle according to the present embodiment as viewed from above. The width and length of a concavity or a convexity and the distance between concavities or convexities are shown. Furthermore, the aspect ratio of a concavity or convexity is the ratio of the length of the major axis/length of the minor axis, and in FIG. 13, the aspect ratio is (length of a concavity or a convexity)/(width of a concavity or a convexity). That is, in a case in which the length side is larger (longer) than the width, the aspect ratio is defined as length/width, and in a case in which the width side is larger (longer) than the length, the aspect ratio is defined as width/length. A larger aspect ratio is more preferable because it is easier to exhibit magnetically uniaxial anisotropy (anisotropy). In FIG. 12, concavities 2b, convexities 2c, flat surfaces 2a, and flaky magnetic metal particles 2 are illustrated.

Furthermore, the phrase "(being) arranged in the first direction" implies that concavities or convexities are arranged such that the longer side between the length and the width of the concavities or the convexities is parallel to the first direction. Meanwhile, when concavities or convexities are arranged such that the longer side between the length and the width of the concavities or the convexities is within ±30° in a direction parallel to the first direction, it is said that the concavities or convexities are "arranged in the first direction". Thereby, the flaky magnetic metal particles are likely to exhibit magnetically uniaxial anisotropy in the first direction by a shape magnetic anisotropy effect, which is preferable.

As described above, it is preferable that the flaky magnetic metal particles exhibit magnetic anisotropy in one direction within the flat surface; however, more preferably, when the flaky magnetic metal particles have either or both of a plurality of concavities and a plurality of convexities, the concavities or convexities being arranged in a first direction, and each of the concavities and the convexities having a width of 0.1 μm or more, a length of 1 μm or more, and an aspect ratio of 2 or higher, magnetic anisotropy is more easily induced in the first direction, which is more preferable. From this point of view, a width of 1 μm or more and a length of 10 μm or more are more preferred. The aspect ratio is preferably 5 or higher, and more preferably 10 or higher. By having such concavities or convexities provided on the flaky magnetic metal particles, the adhesiveness between the flaky magnetic metal particles is enhanced at the time of synthesizing a pressed powder material by powder-compacting the flaky magnetic metal particles (the concavities or convexities bring an anchoring effect of attaching the particles to neighboring particles). As a result, mechanical characteristics such as strength and hardness, and thermal stability are enhanced, and therefore, it is preferable.

Figure 14:
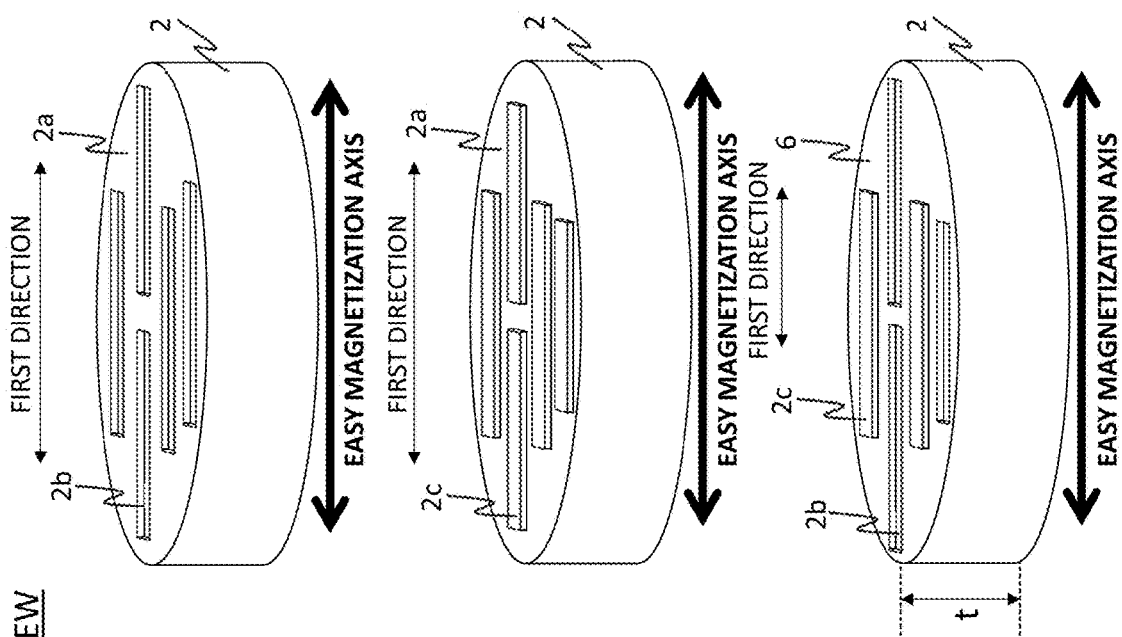
FIG. 14 is a schematic diagram illustrating desirable directions of the easy magnetization axis of flaky magnetic metal particles according to the first embodiment.
Figure 15:
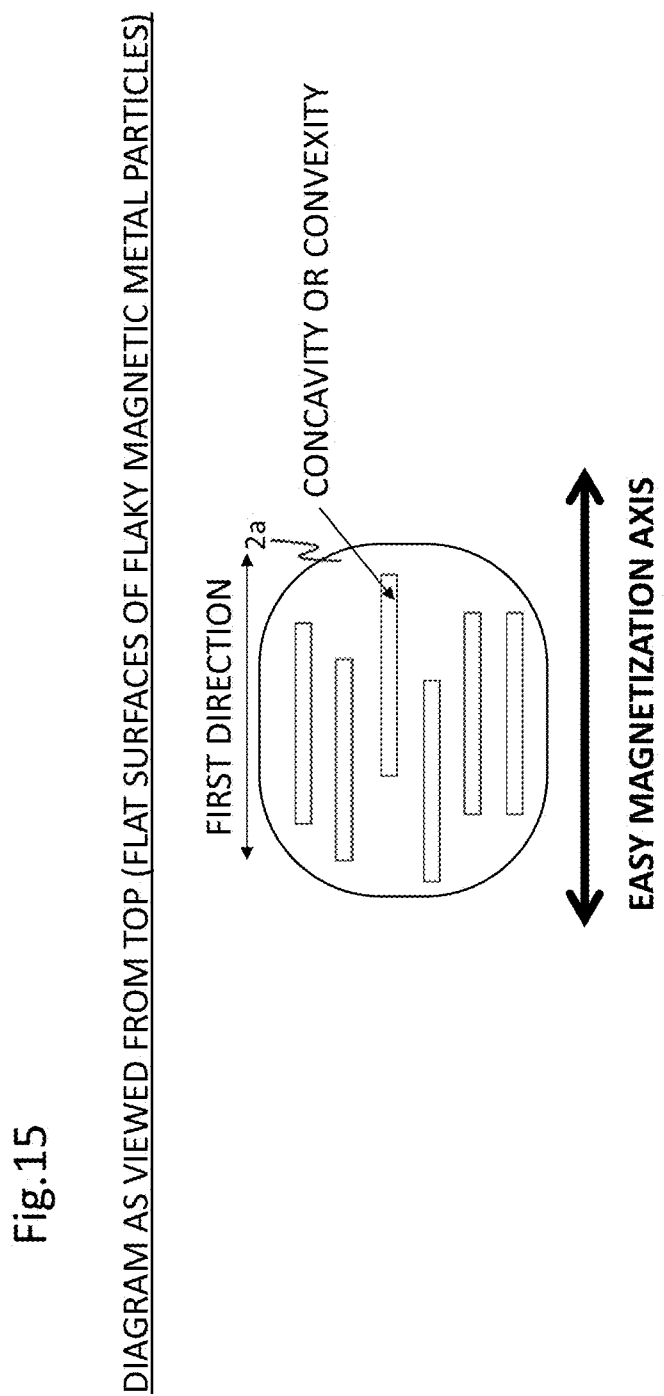
FIG. 15 is a schematic diagram of flaky magnetic metal particles according to the first embodiment.

In regard to the flaky magnetic metal particles, it is preferable that the largest portion of the first directions of either or both of a plurality of concavities and a plurality of convexities is arranged in the direction of the easy magnetization axis. That is, in a case in which there are a large number of directions of arrangement (=first directions) in the flat surface of a flaky magnetic metal particle, it is preferable that the direction of arrangement (=first direction) that accounts for the largest proportion in the large number of directions of arrangement (=first directions), coincides with the direction of the easy axis of the flaky magnetic metal particles. Since the length direction in which the concavities or convexities are arranged, namely, the first direction, is likely to become the easy magnetization axis as a result of the effect of shape magnetic anisotropy, when the flaky magnetic metal particles are oriented with respect to this direction as the easy magnetization axis, magnetic anisotropy can be easily induced, which is preferable. For reference, FIG. 14 and FIG. 15 show schematic diagrams illustrating desired directions of the easy magnetization axes of flaky magnetic metal particles.

Figure 16:
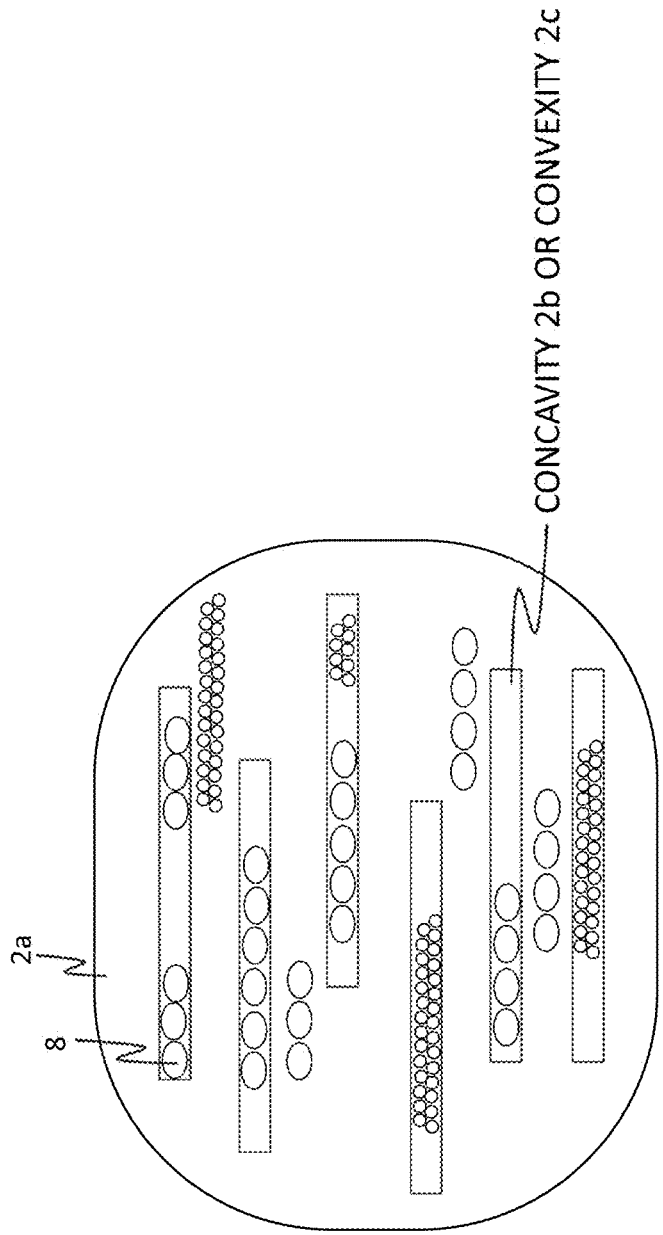
FIG. 16 is a schematic diagram of flaky magnetic metal particles including extraneous metal particles according to the first embodiment.
Figure 17:
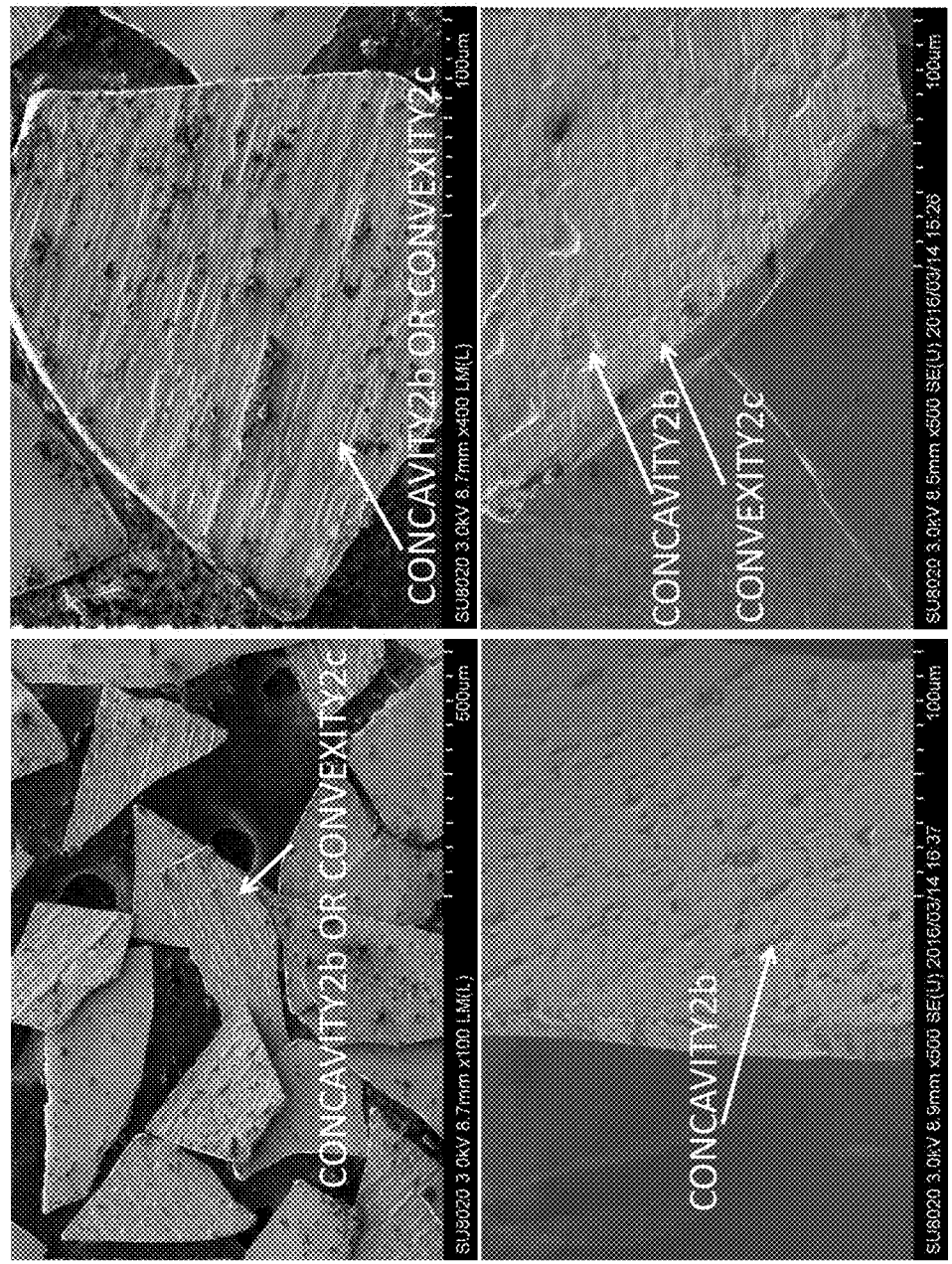
FIG. 17 is scanning electron microscopic photographs of flaky magnetic metal particles according to the first embodiment.
Figure 18:
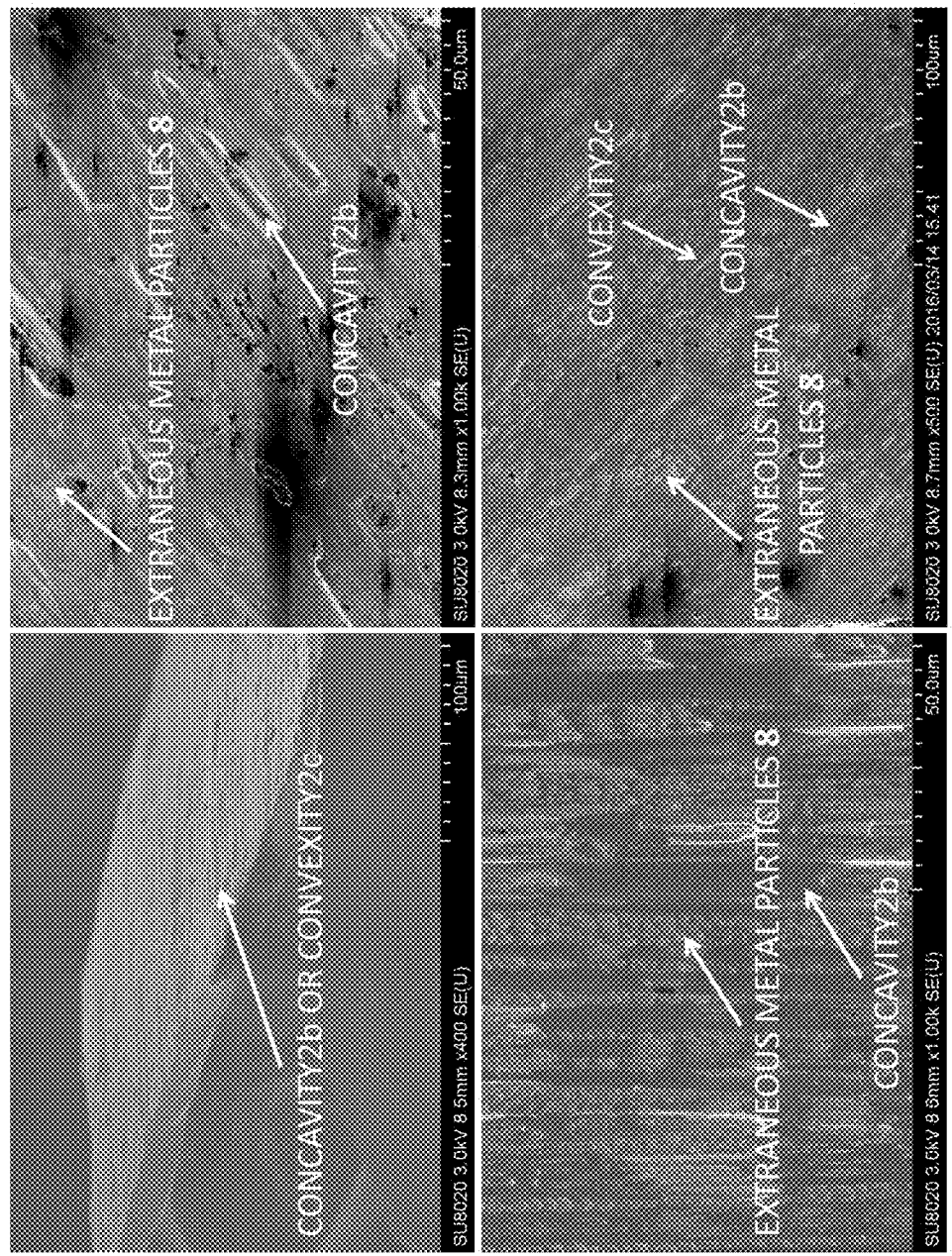
FIG. 18 is scanning electron microscopic photographs of flaky magnetic metal particles according to the first embodiment.

In regard to either or both of a plurality of concavities and a plurality of convexities, it is desirable that five or more on the average of those are included in one flaky magnetic metal particle. Here, five or more concavities may be included, five or more convexities may be included, or the sum of the number of concavities and the number of convexities may be 5 or larger. More preferably, it is desirable that ten or more of concavities or convexities are included. It is also desirable that the average distance in the width direction between the respective concavities or convexities is from 0.1 μm to 100 μm. It is also desirable that a plurality of extraneous metal particles containing at least one first element selected from the group consisting of Fe, Co and Ni and having an average size of from 1 nm to 1 μm, is arranged along the concavities or convexities. Regarding the method for determining the average size of the extraneous metal particles, the average size is calculated by averaging the sizes of a plurality of extraneous metal particles arranged along the concavities or convexities, based on observation by TEM, SEM, optical microscopy, or the like. When these conditions are satisfied, magnetic anisotropy is easily induced in one direction, which is preferable. Furthermore, the adhesiveness between the flaky magnetic metal particles is enhanced when a pressed powder material is synthesized by powder-compacting the flaky magnetic metal particles (the concavities or convexities bring an anchoring effect of attaching the particles to neighboring particles), and thereby, mechanical characteristics such as strength and hardness, and thermal stability are enhanced, which is preferable. For reference, FIG. 16 shows a schematic diagram of a flaky magnetic metal particle including extraneous metal particles. In FIG. 16, extraneous metal particles 8 are illustrated. Furthermore, FIG. 17 and FIG. 18 show examples of scanning electron microscopic photographs of flaky magnetic metal particles according to the first embodiment.

Figure 19:
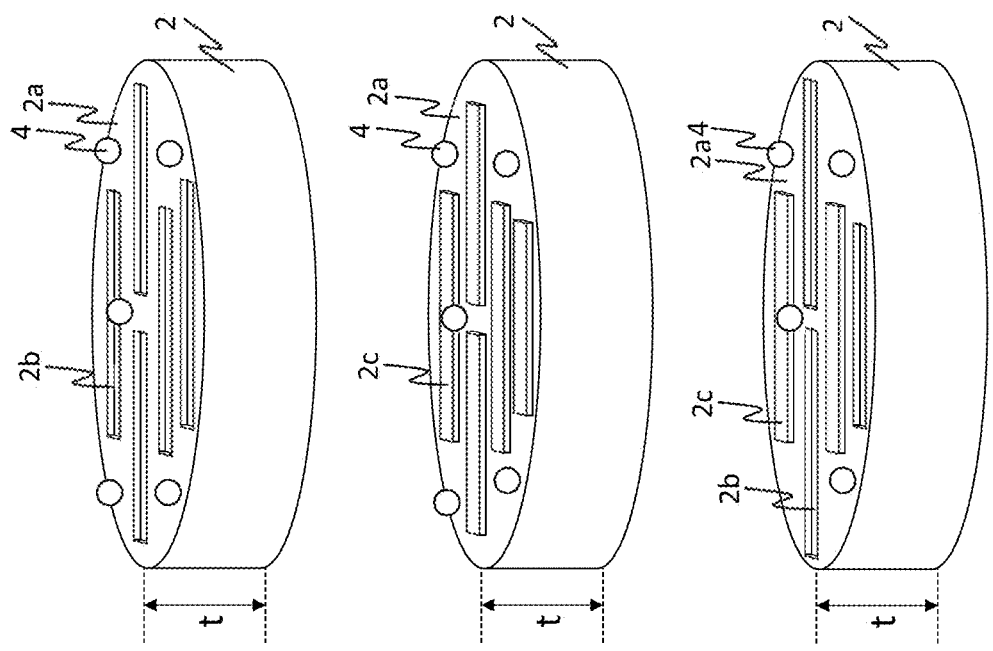
FIG. 19 is a schematic diagram of flaky magnetic metal particles having small magnetic metal particles according to the first embodiment.

It is desirable that each of the flaky magnetic metal particles further includes a plurality of small magnetic metal particles, that is, five or more particles on the average, on the flat surface. FIG. 19 is a schematic diagram of flaky magnetic metal particles having small magnetic metal particles. The small magnetic metal particles contain at least one first element selected from the group consisting of Fe, Co, and Ni, and the average particle size is from 10 nm to 1 μm. More preferably, the small magnetic metal particles have a composition that is equal to that of the flaky magnetic metal particles. As the small magnetic metal particles are provided on the surface of the flat surface, or the small magnetic metal particles are integrated with the flaky magnetic metal particles, the surface of the flaky magnetic metal particles is brought to an artificially slightly damaged state. As a result, when the flaky magnetic metal particles are powder-compacted together with an intercalated phase that will be described below, adhesiveness is greatly enhanced. Thereby, thermal stability and mechanical characteristics such as strength and toughness can be easily enhanced. In order to exhibit such effects at the maximum level, it is desirable that the average particle size of the small magnetic metal particles is adjusted to be from 10 nm to 1 μm, and five or more small magnetic metal particles on the average are integrated with the surface, that is, the flat surface, of the flaky magnetic metal particles. Meanwhile, when the small magnetic metal particles are unidirectionally arranged within the flat surface, magnetic anisotropy can be easily induced in the flat surface, and high magnetic permeability and low losses can be easily realized. Therefore, it is more preferable. The average particle size of the small magnetic metal particles is determined by observing the particles by TEM, SEM, optical microscopy, or the like.

The variation in the particle size distribution of the flaky magnetic metal particles can be defined by the coefficient of variation (CV value). That is, CV value (%)=[standard deviation of particle size distribution (μm)/average particle size (μm)]×100. It can be said that as the CV value is smaller, a sharp particle size distribution with less variation in the particle size distribution is obtained. When the CV value defined as described above is from 0.1% to 60%, low coercivity, low hysteresis loss, high magnetic permeability, and high thermal stability can be realized, which is preferable. Furthermore, since the variation is small, it is also easy to realize a high yield. A more preferred range of the CV value is from 0.1% to 40%.

The average thickness of the flaky magnetic metal particles is preferably from 10 nm to 100 μm, and more preferably from 1 μm to 100 μm. Furthermore, the average value of the ratio of the average length in the flat surface with respect to thickness is preferably from 5 to 10,000, and more preferably from 10 to 1,000. It is preferable that flaky magnetic metal particles in which the ratio of the average length in the flat surface with respect to thickness is from 5 to 10,000 are included, and it is more preferable that flaky magnetic metal particles in which the ratio is from 10 to 1,000 are included. When the thickness is small and the aspect ratio is large, it is preferable from the viewpoint that the eddy current loss is easily reduced; however, on the other hand, coercivity tends to become slightly high. Therefore, from the viewpoint of lowering coercivity, it is preferable to have an appropriate thickness and an appropriate ratio of the average length in the flat surface with respect to thickness. With regard to the thickness and the ratio of the average length in the flat surface with respect to thickness in the above-mentioned ranges, a material that is well-balanced in view of the eddy current loss and coercivity is obtained.

A thickness means an average thickness of a single flaky magnetic metal particle. Regarding the method for determining the thickness, the method is not limited as long as it is a method capable of determining the average thickness in one flaky magnetic metal particle. For example, a method of observing a cross-section that is perpendicular to a flat surface of a flaky magnetic metal particle by transmission electron microscopy (TEM), scanning electron microscopy (SEM), optical microscopy, or the like, selecting any arbitrary ten or more sites in the in-plane direction within the flat surface in a cross-section of the flaky magnetic metal particle thus observed, measuring the thicknesses at the various selected sites, and employing the average value of the thicknesses, may be used. Furthermore, a method of selecting ten or more sites in the observed cross-section of the flaky magnetic metal particle from an end toward the other end at an equal interval in an in-plane direction within the flat surface (at this time, since the end and the other end are special places, it is preferable not to select the end parts), measuring the thickness at each of the sites thus selected, and employing the average value of the thicknesses, may also be used (in FIG. 20, the method for determining the thickness in this case is specifically illustrated). All of the methods are preferable because when measurement is made at sites as many as possible, average information can be obtained. Meanwhile, in a case in which the contour lines of the cross-section has intense irregularities, or the surface has a rough contour line, and it is difficult to determine the average thickness in an intact state, it is preferable that the contour line is smoothened into an average straight line or curve appropriately according to the circumstance, and then the above-described method is carried out.

Furthermore, the average thickness refers to the average value of the thickness of a plurality of flaky magnetic metal particles, and the average thickness is distinguished from the simple "thickness" described above. When the average thickness is to be determined, it is preferable to employ an average value calculated for twenty or more flaky magnetic metal particles. Furthermore, it is preferable to determine the average thickness for as many flaky magnetic metal particles as possible as the objects of measurement, because average information can be obtained. Furthermore, in a case in which an observation of twenty or more flaky magnetic metal particles cannot be made, it is preferable that an observation of as many flaky magnetic metal particles as possible is made, and an average value calculated for those particles is employed. The average thickness of the flaky magnetic metal particles is set so as to satisfy the range of from 10 nm to 100 μm from the viewpoint of reducing the eddy current loss; however, the average thickness is not limited to this and may be made thinner.

The average length of a flaky magnetic metal particle is defined by the formula: (a+b)/2, using the maximum length a and the minimum length b in the flat surface. The maximum length a and the minimum length b can be determined as follows. For example, among rectangles that circumscribe the flat surface, a rectangle having the smallest area is considered. Then, the length of the long side of the rectangle is designated as maximum length a, and the length of the short side is designated as minimum length b. FIGS. 21A to 21D are schematic diagrams illustrating the maximum length a and the minimum length b determined by the above-described method by taking several flaky magnetic metal particles as examples. The maximum length a and the minimum length b can be determined, similarly to the case of the average thickness, by observing the flaky magnetic metal particles by TEM, SEM, optical microscopy, or the like. Furthermore, it is also possible to determine the maximum length a and the minimum length b by performing an image analysis of microscopic photographs with a computer. For all of them, it is preferable to determine the maximum length and the minimum length for twenty or more flaky magnetic metal particles as the objects of measurement. Furthermore, it is preferable to determine the maximum length and the minimum length for as many flaky magnetic metal particles as possible as the objects of measurement because average information can be obtained. Furthermore, in a case in which it is not possible to observe twenty or more flaky magnetic metal particles, it is preferable that an observation of as many flaky magnetic metal particles as possible is made, and average values obtained for those metal particles are employed. Furthermore, in this case, since it is preferable to determine the maximum length and the minimum length as average values as far as possible, it is preferable to perform an observation or an image analysis in a state in which the flaky magnetic metal particles are uniformly dispersed (in a state in which a plurality of flaky magnetic metal particles having different maximum lengths and minimum lengths is dispersed in a manner as random as possible). For example, it is preferable that an observation or an image analysis is carried out by sufficiently stirring a plurality of flaky magnetic metal particles and adhering the flaky magnetic metal particles onto a tape in that stirred state, or by dropping a plurality of flaky magnetic metal particles from above to fall down and adhering the particles onto a tape.

Figure 22:
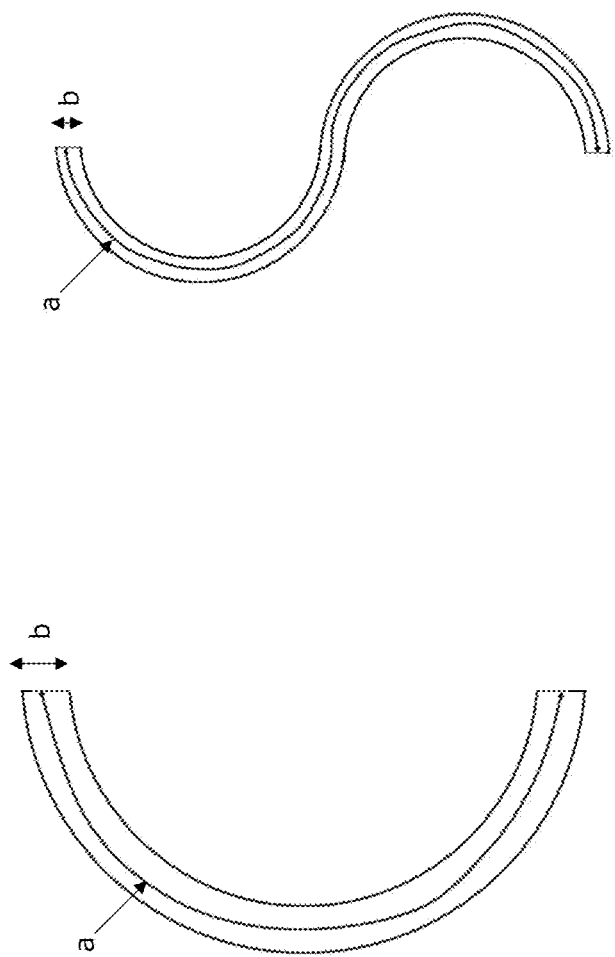
FIG. 22 is a conceptual diagram for describing the method for determining the maximum length and the minimum length in a flat surface of a flaky magnetic metal particle according to the first embodiment.

However, depending on the flaky magnetic metal particles, there are occasions in which when the maximum length a and the minimum length b are determined by the method described above, the method may become a determination method that does not have any regard to the essence. For example, in a case similar to FIG. 22, the flaky magnetic metal particles are in a state of being elongatedly curved state; however, in this case, the maximum length and the minimum length of the flaky magnetic metal particles are essentially the lengths of a and b illustrated in FIG. 22. As such, the method for determining the maximum length a and the minimum length b cannot be decided completely uniformly, and basically, there is no problem with a method of "considering a rectangle having the smallest area among the rectangles circumscribing the flat surface, and designating the length of the long side of the rectangle as the maximum length a, and the length of the short side as the minimum length b". However, depending on the shape of the particles, in a case in which the essence is disregarded in this method, the maximum length a and the minimum length b are determined as the maximum length a and the minimum length b, for which the essence is considered, according to the circumstances. The thickness t is defined as the length in a direction perpendicular to the flat surface. The ratio A of the average length within the flat surface with respect to the thickness is defined by the formula: $A=((a+b)/2)/t$, using the maximum length a, minimum length b, and thickness t.

The average value of the ratio of the average length in the flat surface to the thickness of the flaky magnetic metal particles is preferably from 5 to 10,000. This is because the magnetic permeability increases according to the ratio. Furthermore, it is because since the ferromagnetic resonance frequency can be increased, the ferromagnetic resonance loss can be reduced.

Regarding the ratio of the average length in the flat surface with respect to the thickness, an average value is employed. Preferably, it is preferable to employ an average value calculated for twenty or more flaky magnetic metal particles. It is also preferable to determine the average value by taking as many flaky magnetic metal particles as possible as the objects of measurement, because average information can be obtained. In a case in which an observation of twenty or more flaky magnetic metal particles cannot be made, it is preferable that an observation is made for as many flaky magnetic metal particles as possible, and an average value calculated for those particles is employed. In addition, for example, in a case in which there are particle Pa, particle Pb, and particle Pc, and the thicknesses of the particles are referred to as Ta, Tb, and Tc, respectively, while the average lengths in the flat surface are referred to as La, Lb, and Lc, respectively, the average thickness is calculated by the formula: (Ta+Tb+Tc)/3, and the average value of the ratio of the average length in the flat surface with respect to the thickness is calculated by the formula: (La/Ta+Lb/Tb+Lc/Tc)/3.

It is preferable that the pressed powder material includes particles whose ratio a/b of the maximum length a to the minimum length b in a flat surface is from 1 to 3 on the average, more preferably from 1 to 2, and even more preferably from 1 to 1.5. Thereby, fluidity and the packing property of the particles are enhanced, and a pressed powder material having high density is obtained. Furthermore, when the particles are powder-compacted, there is less chance that the particles are powder-compacted in a bent state, and the stress to the particles is likely to be reduced. That is, strain is reduced, and this leads to reduction of the coercivity and the hysteresis loss. Also, since stress is reduced, thermal stability and mechanical characteristics such as strength and toughness are likely to be enhanced.

Figure 23A:
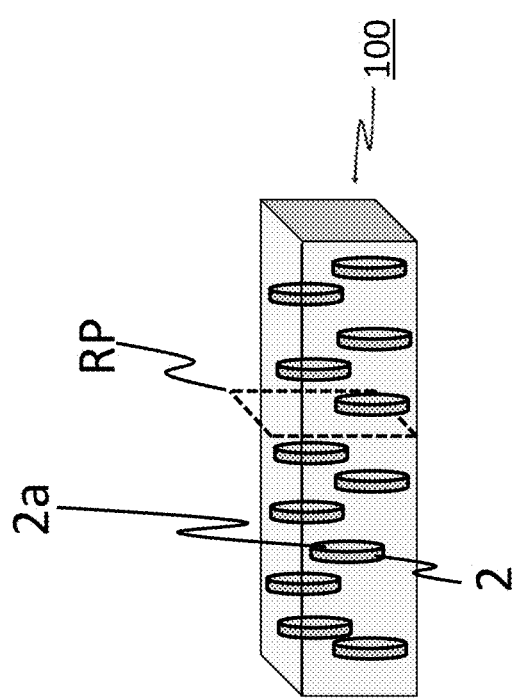
FIGS. 23A and 23B are schematic diagram illustrating the disposition of flaky magnetic metal particles in a pressed powder material.

According to embodiments, the term "being oriented" means a state in which the flat surfaces of flaky magnetic metal particles are aligned in a particular direction. Whether the flat surfaces of the flaky magnetic metal particles are aligned is judged by making observation of ten or more flaky magnetic metal particles included in a pressed powder material by scanning electron microscopy (SEM) or the like, determining the angle formed by a reference plane arbitrarily determined by the measurer and the flat surface of a flaky magnetic metal particle, and making judgment based on the degree of variation of the angle. It is preferable that the variation of the angle formed by the flat surface of a flaky magnetic metal particle included in a pressed powder material and a reference plane is adjusted to be in the range of ±20°, from the viewpoint of increasing the yield strength of the pressed powder material against centrifugal force or the like, and from the viewpoint of increasing the magnetic permeability in the axial direction. This configuration is schematically illustrated in FIG. 23A in order to make the configuration easily understandable. In FIG. 23A, the normal lines of the flat surfaces of all the flaky magnetic metal particles included in a pressed powder material are arranged to be coincident with a particular direction. Furthermore, FIG. 23B explains the angle formed by the flat surface of a flaky magnetic metal particle included in a pressed powder material and a reference plane.

Figure 23B:
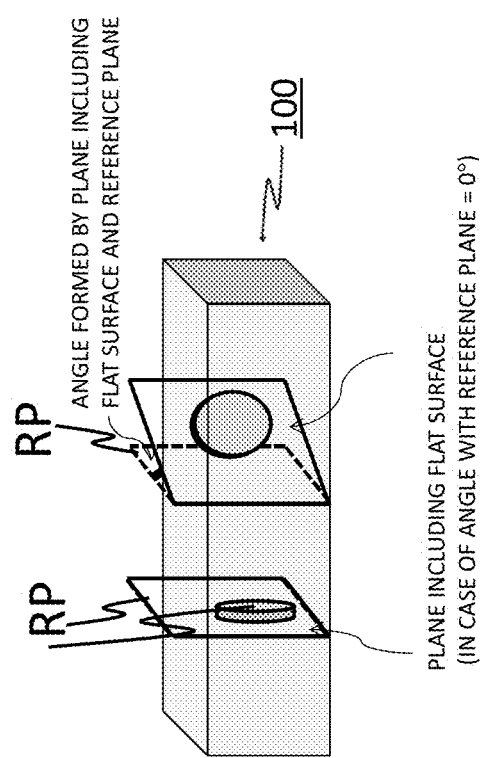

In FIGS. 23A and 23B, a pressed powder material 100, flaky magnetic metal particles 2, flat surfaces 2a, and a reference plane RP are illustrated.

Figure 24:
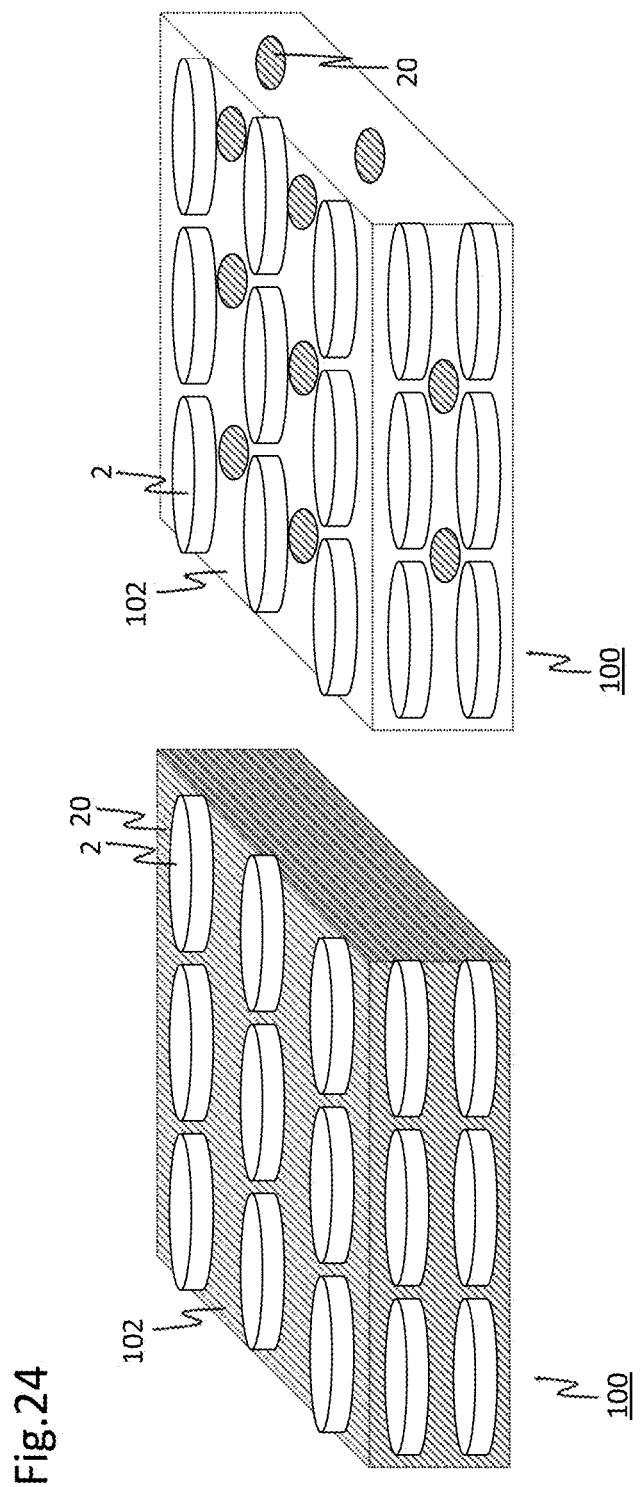
FIG. 24 is a conceptual diagram illustrating the relationship between the direction of magnetic flux and the direction of disposition in a pressed powder material.

Furthermore, it is preferable that the intercalated phase contains at least one element selected from the group consisting of O, C, N, and F. It is because the electrical resistance of the intercalated phase is increased thereby, and the eddy current loss of the pressed powder material can be reduced. From this point of view, it is preferable that the electrical resistance of the intercalated phase is higher than that of the flaky magnetic metal particles. Since the intercalated phase exists so as to surround the flaky magnetic metal particles, the oxidation resistance and thermal stability of the flaky magnetic metal particles can be enhanced, which is preferable. An intercalated phase including oxygen therein is more preferred from the viewpoint of high oxidation resistance and high thermal stability. Since the intercalated phase plays a role of mechanically adhering the flaky magnetic metal particles with other flaky magnetic metal particles, it is also preferable from the viewpoint of high strength. For example, FIG. 24 shows the intercalated phase 20; however, the form of the intercalated phase 20 is not limited to this.

Furthermore, since the intercalated phase also plays a role of mechanically adhering flaky magnetic metal particles with other flaky magnetic metal particles, it is preferable to incorporate at least one or more reinforcing materials selected from glass fibers, carbon fibers, silicon carbide fibers, boron fibers, alumina fibers, aramid fibers, PBO fibers, polyallylate fibers, polyethylene fibers, polyolefin fibers, vinylon fibers, polyester fibers, and nylon fibers.

Regarding the intercalated phase, it is preferable that an amount of from 0.01 wt % to 80 wt %, more preferably from 0.1 wt % to 40 wt %, and even more preferably from 0.1 wt % to 20 wt %, with respect to the total amount of the pressed powder material is included. When the proportion of the intercalated phase is too large, the proportion of the flaky magnetic metal particles that are in charge of magnetic properties becomes small, and therefore, the saturation magnetization and the magnetic permeability of the pressed powder material are reduced, which is not preferable. On the contrary, when the proportion of the intercalated phase is too small, bonding between the flaky magnetic metal particles and the intercalated phase is weakened, and it is not preferable from the viewpoints of thermal stability and mechanical characteristics such as strength. From the viewpoints of magnetic characteristics such as saturation magnetization and magnetic permeability, thermal stability, and mechanical characteristics, the optimal proportion of the intercalated phase is from 0.01 wt % to 80 wt %, more preferably from 0.1 wt % to 40 wt %, and even more preferably from 0.1 wt % to 20 wt %, with respect to the total amount of the pressed powder material.

Furthermore, it is preferable that the proportion of lattice mismatch between the intercalated phase and the flaky magnetic metal particles is from 0.1% to 50%. Thereby, appropriately high magnetic anisotropy can be easily induced, and the above-described magnetic characteristics are enhanced, which is therefore preferable. In order to set the lattice mismatch to the range described above, the range of lattice mismatch can be realized by selecting the combination of the composition of the intercalated phase and the composition of the flaky magnetic metal particles 10. For example, Ni of the fcc structure has a lattice constant of 3.52 Å, and MgO of the NaCl type structure has a lattice constant of 4.21 Å. Thus, the lattice mismatch of the two is (4.21−3.52)/3.52×100=20%. That is, the lattice mismatch can be set to 20% by employing Ni of the fcc structure as the main composition of the flaky magnetic metal particles and employing MgO for the intercalated phase 20. As such, the lattice mismatch can be set to the range described above by selecting the combination of the main composition of the flaky magnetic metal particles and the main composition of the intercalated phase.

As described above, according to the present embodiment, since both the yield strength against centrifugal force or the like and the magnetic permeability in the axial direction can be increased for a pressed powder material, a high-performance rotating electric machine can be easily configured.

Figure 25:
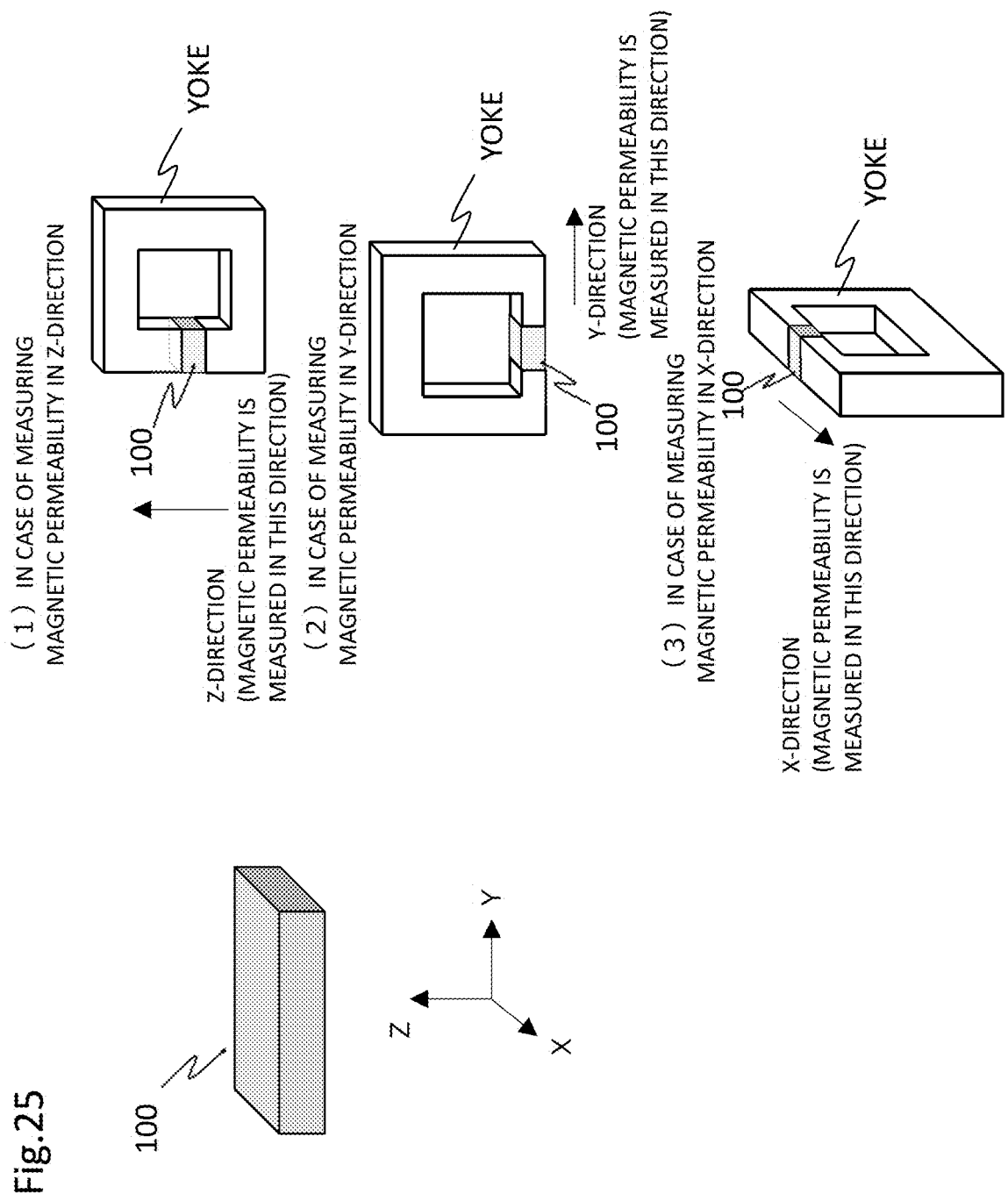
FIG. 25 is a schematic diagram illustrating a method for measuring magnetic permeability according to the first embodiment.

Incidentally, the magnetic permeability according to the present embodiment is the true magnetic permeability that does not depend on shape. That is, the magnetic permeability is the true magnetic permeability that is not affected by a diamagnetic field. Effective magnetic permeability varies because when the shape changes, the effect extent of the diamagnetic field is also changed. However, the true magnetic permeability is a magnetic permeability from which the influence of the diamagnetic field has been removed, and the true magnetic permeability can be determined by forming a complete closed magnetic path and making measurement. For example, when the sample (pressed powder material) is ring-shaped, a closed magnetic path is completely formed, and therefore, the true magnetic permeability is easily determined. Furthermore, even in a case in which the sample (pressed powder material) is not ring-shaped, as shown in FIG. 25, when a closed magnetic path is formed using yokes, the true magnetic permeability can be determined.

In a case in which it is difficult to accurately measure the magnetic permeability in three directions, coercivity may be measured in three directions, and the magnetic permeability may be estimated. Generally, coercivity and magnetic permeability are dependent on the magnitude of magnetic anisotropy so that when magnetic anisotropy is low, coercivity also becomes low, while on the contrary, magnetic permeability becomes high. In contrast, when magnetic isotropy is high, coercivity also becomes high, while on the contrary, magnetic permeability becomes low. Therefore, coercivity and magnetic permeability are correlated to each other via magnetic anisotropy, and the magnitude of magnetic permeability can be estimated from the value of coercivity.

Coercivity can be evaluated using a vibrating sample magnetometer (VSM) or the like. In a case in which coercivity is low, even a coercivity of 0.1 Oe or less can be measured by using a low magnetic field unit.

However, there are also occasions in which even if coercivity is the same, the magnetic permeability is not the same. Even with the same coercivity, the magnetic permeability becomes high in a direction parallel to the flat surface due to an effect of shape-dependent magnetic anisotropy, and the magnetic permeability becomes low in a direction perpendicular to the flat surface. Therefore, in the case of determining the relationship of the magnitude of magnetic permeability with coercivity, it is preferable that the magnetic permeability is first estimated with the magnitude of coercivity, subsequently the shape of the flaky magnetic metal particles included in the pressed powder material is observed, the effect of shape-dependent magnetic anisotropy is estimated from the shape, and the relationship of the magnitude of magnetic permeability is comprehensively judged.

Subsequently, a method for producing a pressed powder material that is used for the rotating electric machine according to the present embodiment will be described. First, the above-mentioned flaky magnetic metal particles are prepared and subjected to a heat treatment. The heat treatment is carried out, for example, at a temperature of from 100° C. to 1,500° C. for 10 minutes or longer. Next, at least any one step of a step of forming an insulation coating on the surface of the flaky magnetic metal particles or a step of mixing the flaky magnetic metal particles with an intercalated phase is carried out, and then the resulting material is charged into a mold and is compression-molded at a pressure of, for example, from 100 MPa to 1,500 MPa. Then, the pressed powder material thus obtained is subjected to mechanical processing as necessary, and then magnetic anisotropy is induced in the principal plane by applying a heat treatment while applying a magnetic field (heat treatment in a magnetic field). FIG. 26 is a schematic diagram illustrating an example of the heat treatment in a magnetic field in the method for producing a pressed powder material according to the present embodiment. FIG. 26 is a schematic diagram illustrating an example of a step of aligning the easy magnetization axes of flaky magnetic metal particles along a predetermined curve. As shown in FIG. 26, the easy magnetization axes of a plurality of flaky magnetic metal particles included in the internal part of a pressed powder material can be made to conform to a predetermined curve by disposing a magnetic field generator and applying a heat treatment while applying a magnetic field. The magnetic field generator may be any of a permanent magnet or an electromagnet so long as the direction of magnetic flux does not change over time. Furthermore, it is effective to apply the same magnetic field when flaky magnetic metal particles are heat-treated, when flaky magnetic metal particles are charged into a mold, or when flaky magnetic metal particles are subjected to compression molding.

Since the pressed powder material according to the present embodiment is composed of flaky magnetic metal particles in which the ratio a/b of the maximum length a to the minimum length b in a flat surface is close to 1, even if the packing ratio of particles is high, the easy magnetization axes can be aligned along predetermined curves. FIG. 27 is a conceptual diagram for explaining this effect. FIG. 27 is a schematic diagram illustrating an operating effect for the method for producing a pressed powder material according to the present embodiment. FIG. 27 shows flaky magnetic metal particles in a pressed powder material after performing the step illustrated in FIG. 26. In the diagram shown on the left-hand side of FIG. 27, since the ratio a/b of the maximum length a to the minimum length b in a flat surface is close to 1, even if the packing ratio is high, the easy magnetization axes in the flat surfaces can be aligned along a predetermined curve. In the diagram shown on the right-hand side of FIG. 27, since the ratio a/b of the maximum length a to the minimum length b in a flat surface is larger than 3, when the packing ratio becomes high, rotation to other particles is inhibited, and it is difficult to align the easy magnetization axes in the flat surfaces along a predetermined curve. On the other hand, in the case of inducing magnetic anisotropy on the basis of the shape of particles only, it is preferable to decrease the packing ratio so that the rotation of a particle is not inhibited by other particles.

Second Embodiment

Figure 28:
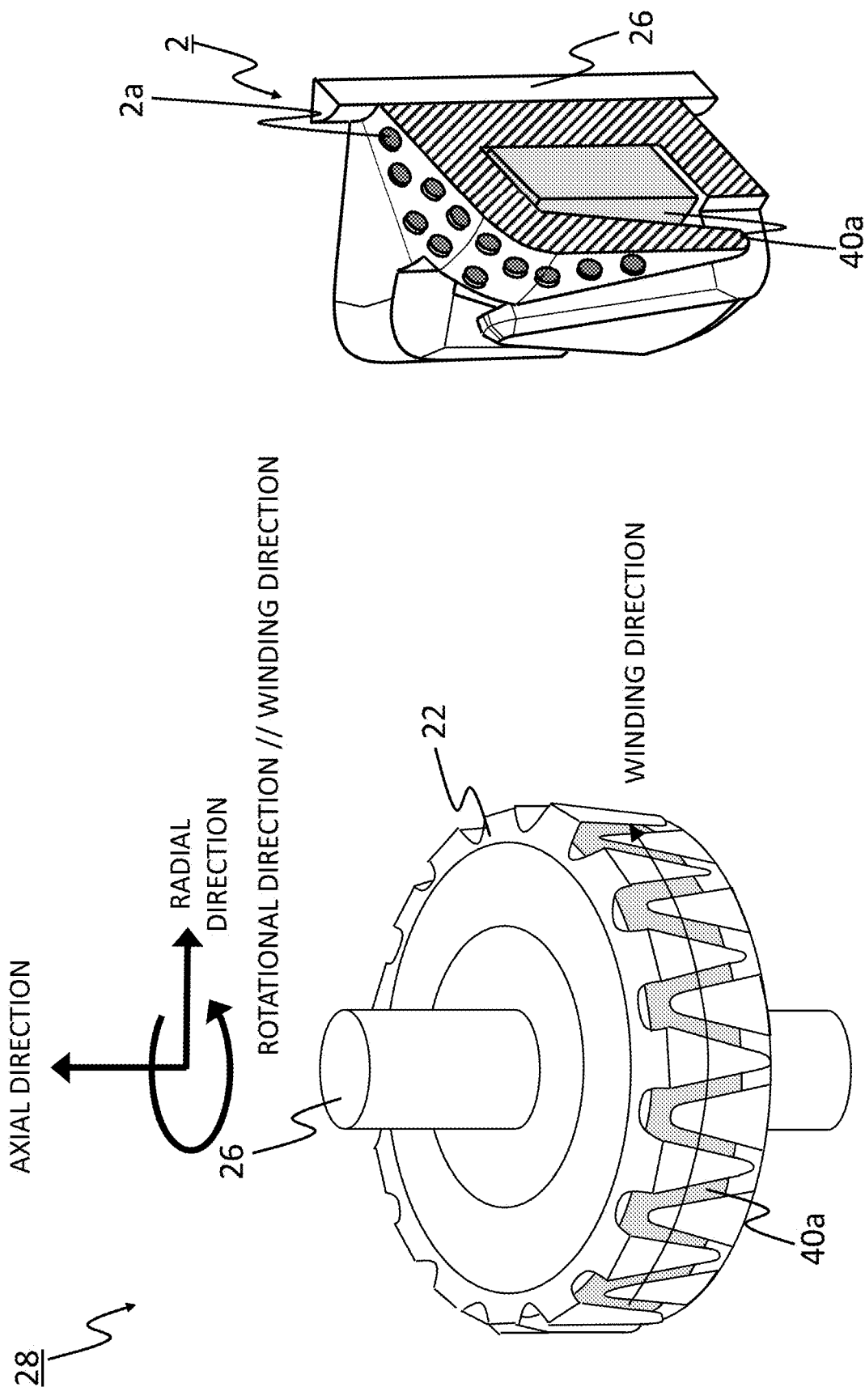
FIG. 28 is a schematic diagram illustrating a rotating electric machine according to a second embodiment.
Figure 29:
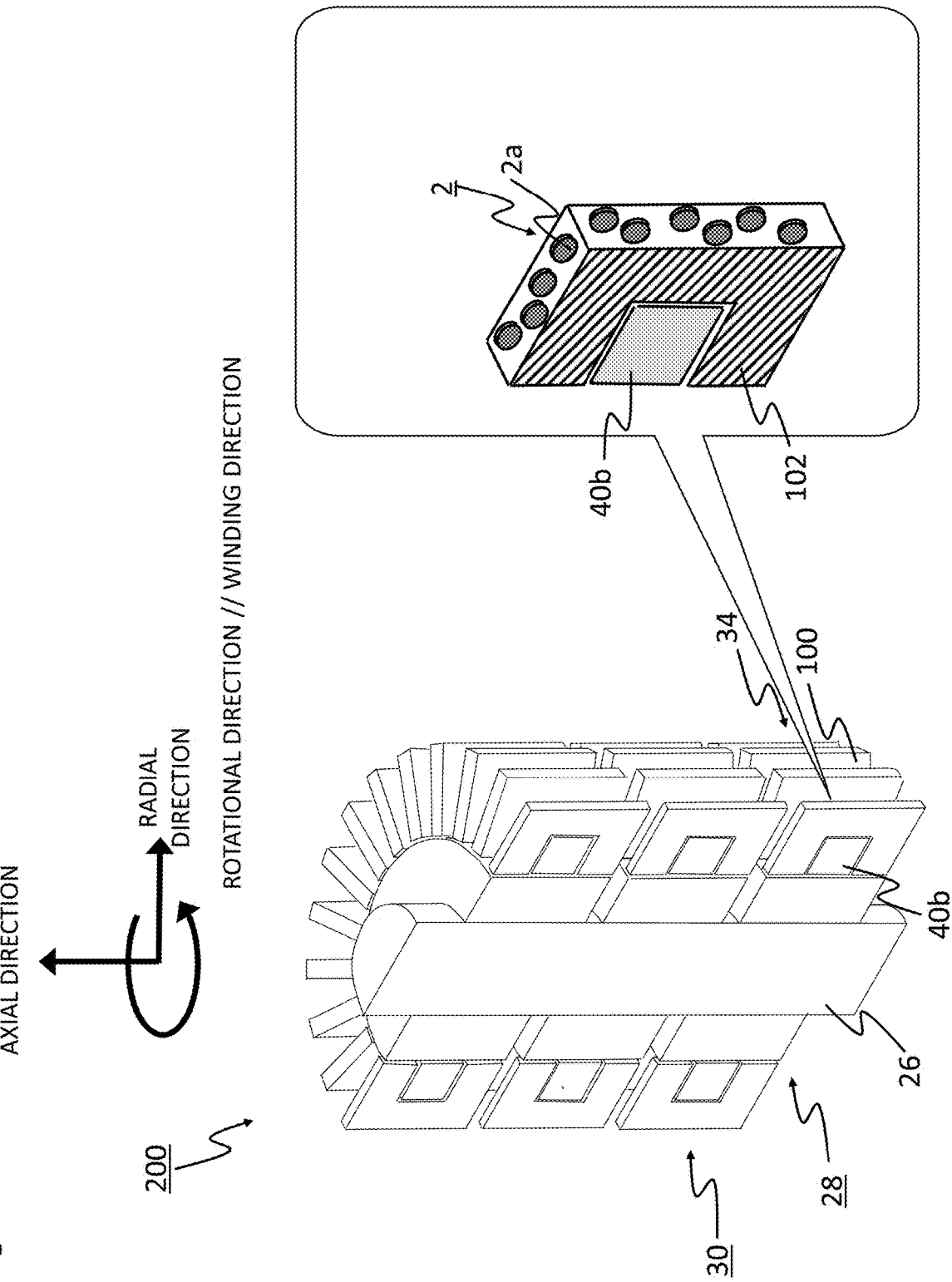
FIG. 29 is a schematic diagram illustrating a rotating electric machine according to the second embodiment.

The rotating electric machine according to the present embodiment is a rotating electric machine comprising a rotor capable of rotating around a rotating shaft, the rotor having an annular-shaped first coil wound along the rotational direction of the rotor and a first core provided around at least a portion of the first coil; and a stator disposed to face the rotor, the first core including a first pressed powder material having a plurality of first flaky magnetic metal particles and a first intercalated phase, the first flaky magnetic metal particles having an average thickness of from 10 nm to 100 µm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000, the first intercalated phase existing between the first flaky magnetic metal particles and including at least one second element selected from the group consisting of O, C, N, and F, wherein in the first pressed powder material, the first flat surfaces are oriented approximately in parallel with a first principal plane of the first pressed powder material, the first pressed powder material has the difference in magnetic permeability on the basis of direction within the first principal plane, and the first principal plane of the first pressed powder material is disposed to be approximately perpendicular to the winding direction of the first coil. Here, the phrase "the principal plane of the pressed powder material is approximately perpendicular to the winding direction of the coil" means that "the principal plane of the pressed powder material is perpendicular to the winding direction of the coil" and that "the principal plane of the pressed powder material is in the range of from 80° to 100° with respect to the winding direction of the coil". FIG. 28 is a schematic diagram of the rotating electric machine according to the present embodiment. FIG. 28 is a diagram illustrating a disposition example of the flaky magnetic metal particles of the first core in the rotor according to the present embodiment. Meanwhile, illustration of a stator is not shown here in order to make the understanding of the configuration easier. A stator is illustrated in FIG. 29 that will be shown below.

In FIG. 28, a first core 22, a rotating shaft 26, a rotor 28, flaky magnetic metal particles 2, flat surfaces 2a, and a first coil 40a are described.

By adopting such a configuration, magnetic flux flows in a direction parallel to the flat surfaces of the flaky magnetic particles, and therefore, the eddy current loss can be reduced. Furthermore, since the strength of the pressed powder material to electromagnetic force or the like can be increased, a robust rotor can be provided. In addition, since the magnetic permeability in the rotational direction can be lowered, the distance between magnetic poles can be narrowed, and a multipolarized structure can be adopted.

The rotating electric machine according to the present embodiment is a rotating electric machine comprising a rotor capable of rotating around a rotating shaft; and a stator disposed to face the rotor and having an annular-shaped second coil wound along the rotational direction of the rotor and a second core provided around at least a portion of the second coil, the second core including a second pressed powder material having a plurality of second flaky magnetic metal particles and a second intercalated phase, the second flaky magnetic metal particles having an average thickness of from 10 nm to 100 μm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000, the second intercalated phase existing between second flaky magnetic metal particles and including at least one second element selected from the group consisting of O, C, N, and F, wherein in the second pressed powder material, the second flat surfaces are oriented in parallel with a second principal plane of the second pressed powder material and have the difference in magnetic permeability on the basis of direction within the second principal plane, and the second principal plane of the second pressed powder material is disposed to be approximately perpendicular to the winding direction of the second coil. Furthermore, the rotating electric machine according to the present embodiment is a rotating electric machine comprising a rotor capable of rotating around a rotating shaft; a stator disposed to face the rotor and including at least one second core; and an annular-shaped second coil provided between the rotor and the stator and wound along the rotational direction of the rotor, the second core including a second pressed powder material having a plurality of second flaky magnetic metal particles and a second intercalated phase, the second flaky magnetic metal particles having an average thickness of from 10 nm to 100 μm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000, the second intercalated phase existing between the second flaky magnetic metal particles and including at least one second element selected from the group consisting of O, C, N, and F, wherein in the second pressed powder material, the second flat surfaces are oriented approximately in parallel with a second principal plane of the second pressed powder material and have the difference in magnetic permeability on the basis of direction within the second principal plane, and the second principal plane of the second pressed powder material is disposed to be approximately perpendicular to the winding direction of the second coil. FIG. 29 is a schematic diagram illustrating the rotating electric machine according to the present embodiment.

In FIG. 29, a rotating electric machine 200, a rotor 28, a stator 30, a second core, 34, a pressed powder material, a principal plane, flaky magnetic metal particles, flat surfaces, a second coil 40b, and a rotating shaft are described.

The rotating electric machine according to the present embodiment is a transverse flux type rotating electric machine.

By adopting such a configuration, since magnetic flux flows in a direction parallel with the flat surfaces of flaky magnetic particles, the eddy current loss can be reduced. Furthermore, since the strength of the pressed powder material can be increased, a robust stator can be provided. Furthermore, since the magnetic permeability in the rotational direction can be lowered, the distance between magnetic poles can be narrowed, and a multipolarized structure can be adopted.

Meanwhile, as shown in FIG. 29, the rotor may be disposed on the inner side of the stator, or the stator may be disposed on the inner side of the rotor.

In addition, it is preferable for the pressed powder material that the easy magnetization axes of the flaky magnetic metal particles can be aligned in a predetermined single direction. Furthermore, it is preferable that the easy magnetization axes are formed along a predetermined curve by sequentially varying the angle with respect to the axial direction. Thereby, the magnetic permeability of the second core can be enhanced, and therefore, high torque is obtained.

Therefore, according to the present embodiment, a high-performance rotating electric machine can be easily configured.

Third Embodiment

Figure 30B:
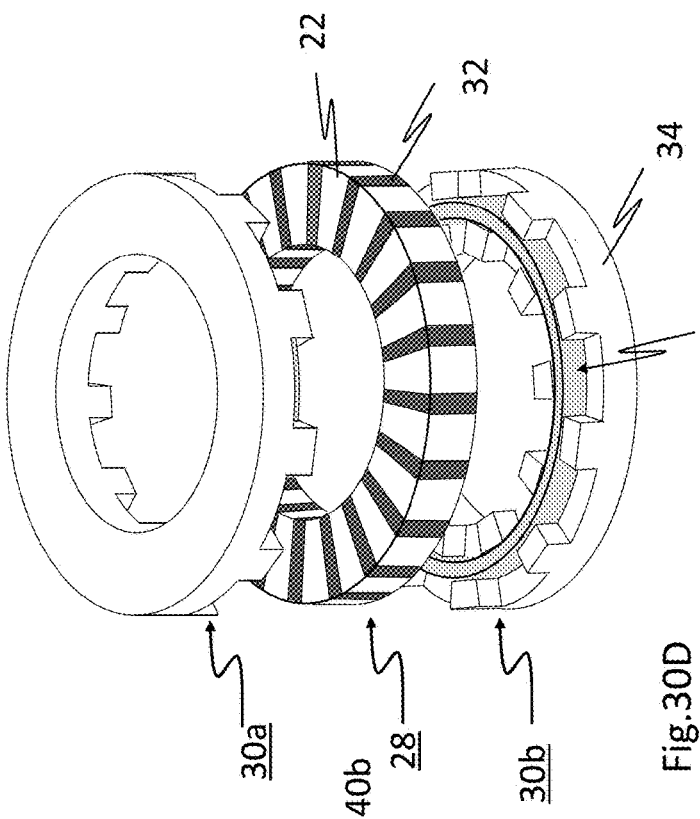
FIGS. 30A to 30D are schematic diagrams illustrating a rotating electric machine according to a third embodiment.
Figure 30D:
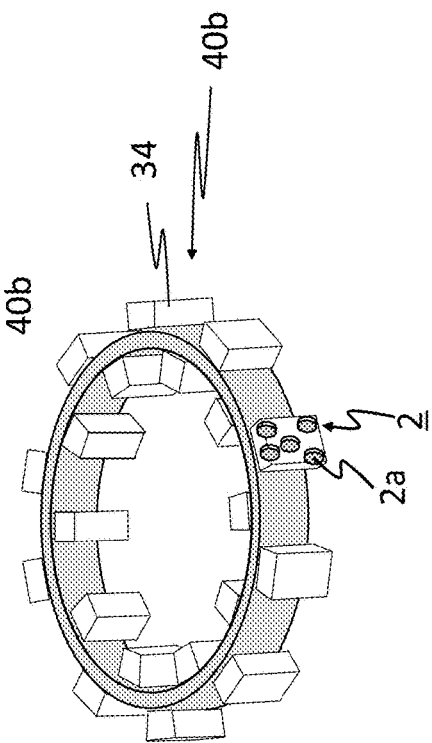
Figure 30A:
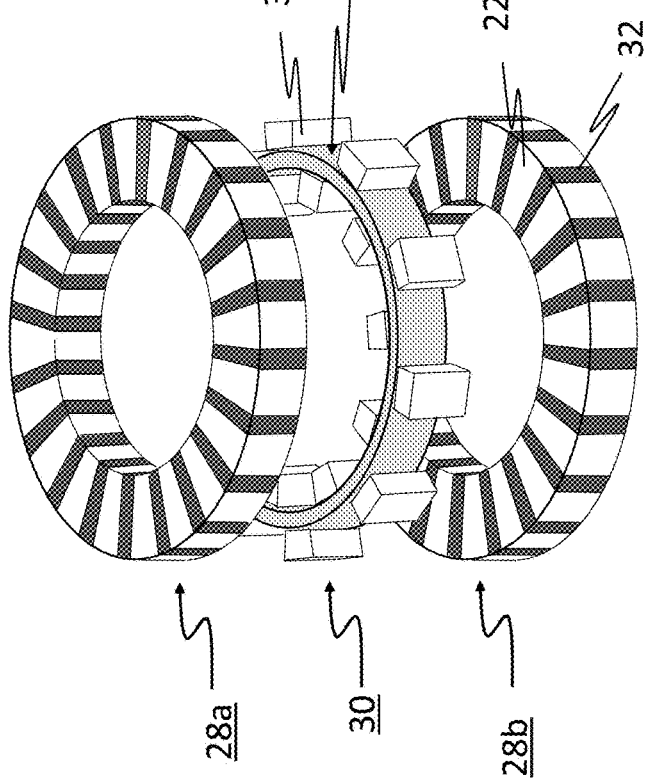
Figure 30C:
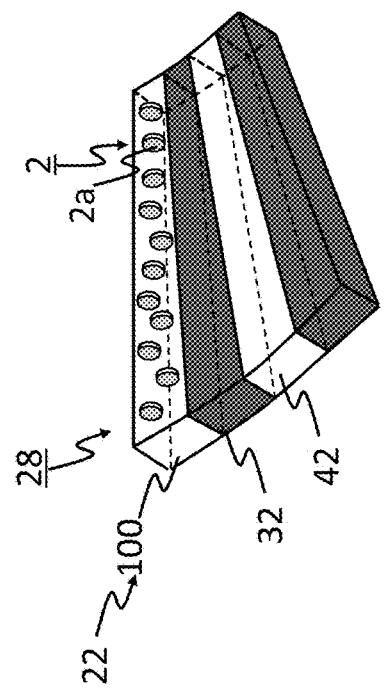

A schematic diagram of the rotating electric machine according to the present embodiment is shown in FIGS. 30A to 30D. Meanwhile, in order to facilitate the understanding of the configuration, the basic unit is extracted, and illustration of the rotating shaft is not shown here. FIG. 30A shows an example of the basic unit comprising one stator and two rotors. FIG. 30B shows an example of the basic unit comprising two stators and one rotor. One rotating electric machine is configured by arranging such a basic unit in the axial direction. The number of the basic units is determined according to the design, and the number can be set to any arbitrary integer of 2 or larger. The torque of the rotating electric machine can be easily adjusted by changing the number of the basic units. FIG. 30C shows an example of the configuration of the rotor 28, in which a plurality of first cores and a plurality of permanent magnets are alternately disposed in the rotational direction. FIG. 30D illustrates an example of the disposition of flaky magnetic metal particles in the second core 34 of the stator 30. In FIGS. 30A to 30D, flaky magnetic metal particles 2, flat surfaces 2a, first cores 22, rotors 28, stators 30, permanent magnets 32, second cores 34, a second coil 40b, a supporting structure 42, and a pressed powder material 100 are illustrated.

The rotating electric machine shown in FIG. 30A is a rotating electric machine comprising a first rotor including first cores; a stator including an annular-shaped coil disposed to face the first rotor in the axial direction and wound along the rotational direction, and second cores surrounding a portion of the coil; and a second rotor disposed to face the first rotor and the stator in the axial direction and including third cores, the stator being installed between the first rotor and the second rotor, each of the first cores or the third cores including a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material of the first core or the pressed powder material of the third core, the flat surfaces are oriented in parallel with a principal plane of the pressed powder material and have the difference in magnetic permeability on the basis of direction within the principal plane; and the principal plane of the pressed powder material is formed to be approximately perpendicular to the radial direction.

Furthermore, the rotating electric machine illustrated in FIG. 30A is a rotating electric machine comprising a first rotor including first cores; a stator disposed to face the first rotor in the axial direction and including an annular-shaped coil wound along the rotational direction and second cores surrounding a portion of the coil; and a second rotor disposed to face the first rotor and the stator in the axial direction and including third cores, the stator being installed between the first rotor and the second rotor, each of the second cores including a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material of the second core, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

Furthermore, the rotating electric machine illustrated in FIG. 30A is a rotating electric machine comprising a first rotor including first cores; a stator disposed to face the first rotor in the axial direction and including an annular-shaped coil wound along the rotational direction and second cores surrounding a portion of the coil; and a second rotor disposed to face the first rotor and the stator in the axial direction and including third cores, the stator being installed between the first rotor and the second rotor, each of the first cores or the third cores including a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material of the first core or the pressed powder material of the third core, the flat surfaces are oriented in parallel with a principal plane of the pressed powder material and have the difference in magnetic permeability on the basis of direction within the principal plane, the principal plane of the pressed powder material is formed to be approximately perpendicular to the radial direction, the second core includes a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material of the second core, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

Furthermore, the rotating electric machine illustrated in FIG. 30B comprises a first rotor including first cores; a first stator disposed to face the first rotor in the axial direction and including an annular-shaped first coil wound along the rotational direction and second cores surrounding a portion of the first coil; a second stator disposed to face the first rotor and the first stator in the axial direction and including an annular-shaped second coil wound along the rotational direction and third cores surrounding a portion of the second coil, the first rotor being installed between the first stator and the second stator, the second cores or the third cores including a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

Furthermore, the rotating electric machine illustrated in FIG. 30B is a rotating electric machine comprising a first rotor including a first core; a first stator disposed to face the first rotor in the axial direction and including an annular-shaped first coil wound along the rotational direction and second cores surrounding a portion of the first coil; and a second stator disposed to face the first rotor and the first stator in the axial direction and including an annular-shaped second coil wound along the rotational direction and third cores surrounding a portion of the second coil, the first rotor being installed between the first stator and the second stator, each of the first cores including a pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the radial direction.

Furthermore, the rotating electric machine illustrated in FIG. 30B is a rotating electric machine comprising a first rotor including first cores; a first stator disposed to face the first rotor in the axial direction and including an annular-shaped first coil wound along the rotational direction and second cores surrounding a portion of the first coil; and a second stator disposed to face the first rotor and the first stator in the axial direction and including an annular-shaped second coil wound along the rotational direction and third cores surrounding a portion of the second coil, the first rotor being installed between the first stator and the second stator, each of the second cores or the third cores including a first pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the first pressed powder material, the flat surfaces are oriented in parallel with a principal plane of the pressed powder material and have the difference in magnetic permeability on the basis of direction within the principal plane, and the principal plane of the first pressed powder material is formed to be approximately perpendicular to the winding direction of the annular-shaped coil, the first core including a second pressed powder material having a plurality of flaky magnetic metal particles and an intercalated phase, the flaky magnetic metal particles having an average thickness of from 10 nm to 100 µm, each flaky magnetic metal particle having a flat surface and a magnetic metal phase including at least one first element selected from the group consisting of Fe, Co, and Ni, the average value of the ratio of the average length in the flat surface with respect to thickness being from 5 to 10,000, the intercalated phase existing between the flaky magnetic metal particles and including at least one second element selected from the group consisting of O, C, N, and F, wherein in the second pressed powder material, the flat surfaces are oriented in parallel with a principal plane of the pressed powder material and have the difference in magnetic permeability on the basis of direction within the principal plane, and the principal plane of the second pressed powder material is formed to be approximately perpendicular to the radial direction.

By adopting such a configuration, since magnetic flux flows in a direction parallel to the flat surfaces of the flaky magnetic particles, the eddy current loss can be reduced. Furthermore, since the strength of the pressed powder material against the centrifugal force at the time of rotation, the electromagnetic force, and the like can be increased, a robust rotating electric machine can be provided. Thereby, the magnetic permeability of the pressed powder material can be enhanced, and therefore, high torque is obtained.

Therefore, according to the present embodiment, a high-performance rotating electric machine can be easily configured.

The rotating electric machine according to the present embodiment can be applied to transportation systems such as railways, electric cars, and hybrid cars; social systems such as elevators and air-conditioners; industrial systems such as robots, pumps, compressors, and air blowers; energy systems such as thermal power generators, hydro-electric power generators, wind power generators, nuclear power generators, and geothermal power generators; and home electrical appliances such as washing machines, and efficiency increase of those systems can be promoted.

Several embodiments and Examples of the present embodiments have been described; however, these embodiments have been suggested as examples and are not intended to limit the scope of the invention. These novel embodiments and Examples can be carried out in other various forms, and various omissions, substitutions, and modifications can be carried out to the extent that the gist of the invention is maintained. These embodiments, Examples, and modifications thereof are included in the scope and gist of the invention and are also included in the inventions described in the claims and equivalent scopes thereof.

While certain embodiments have been described, these embodiments have been presented by way of example only, and are not intended to limit the scope of the inventions. Indeed, a rotating electric machine described herein may be embodied in a variety of other forms; furthermore, various omissions, substitutions and changes in the form of the devices and methods described herein may be made without departing from the spirit of the inventions. The accompanying claims and their equivalents are intended to cover such forms or modifications as would fall within the scope and spirit of the inventions.

Clause 1. A rotating electric machine comprising a rotor including a first core and being capable of rotating around a rotating shaft; and a stator disposed to face the rotor in the axial direction of the rotating shaft, the first core including a first pressed powder material having a plurality of first flaky magnetic metal particles and a first intercalated phase, the first flaky magnetic metal particles having an average thickness of from 10 nm to 100 µm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000, the first intercalated phase existing between the first flaky magnetic metal particles and including at least one second element selected from the group consisting of oxygen (O), carbon (C), nitrogen (N), and fluorine (F), wherein in the first pressed powder material, the first flat surfaces are oriented approximately in parallel with a first principal plane of the first pressed powder material and have the difference in magnetic permeability on the basis of direction within the first principal plane, and the first principal plane of the first pressed powder material is disposed to be approximately perpendicular to the radial direction of the rotating electric machine.

Clause 2. The rotating electric machine according to clause 1, wherein the first core has a plurality of magnetic salient pole parts along the rotational direction of the rotating electric machine.

Clause 3. The rotating electric machine according to clause 1 or 2, wherein the rotor has at least one or more first cores, and the first cores are disposed in contiguity with a plurality of permanent magnets aligned along the rotational direction of the rotating electric machine.

Clause 4. The rotating electric machine according to clause 3, wherein the permanent magnets are disposed alternately with the first cores in the rotational direction of the rotating electric machine.

Clause 5. The rotating electric machine according to clause 1 to 4, wherein a direction having the highest magnetic permeability within a principal plane of the first pressed powder material is aligned approximately in parallel with the axial direction of the rotating electric machine.

Clause 6. The rotating electric machine according to clause 1 to 5, wherein the stator includes a second core and coils wound around the second core, the second core includes a second pressed powder material having a plurality of second flaky magnetic metal particles and a second intercalated phase, the second flaky magnetic metal particles have an average thickness of from 10 nm to 100 μm, each second flaky magnetic metal particle having a second flat surface and a second magnetic metal phase including at least one of the first element selected from the group consisting of Fe, Co, and Ni, the average value of the ratio of the average length in the second flat surface with respect to the average thickness being from 5 to 10,000, the second intercalated phase exists between the second flaky magnetic metal particles and includes at least one of the second element selected from the group consisting of O, C, N, and F, in the second pressed powder material, the second flat surfaces are oriented approximately in parallel with a second principal plane of the second pressed powder material and have the difference in magnetic permeability on the basis of direction within the second principal plane, and the second principal plane of the second pressed powder material is disposed to be approximately perpendicular to the radial direction of the rotating electric machine.

Clause 7. The rotating electric machine according to clause 6, wherein the second core includes a plurality of teeth parts, and in the teeth parts, the directions having the highest magnetic permeability within a principal plane of the second pressed powder material are aligned in the axial direction of the rotating electric machine.

Clause 8. The rotating electric machine according to clause 7, wherein the second core includes yoke parts connecting the teeth parts, and in the yoke parts, the directions having the highest magnetic permeability within a principal plane of the second pressed powder material are aligned in the rotational direction of the rotating electric machine.

Clause 9. The rotating electric machine according to clause 6, wherein the second core includes a plurality of teeth parts, and the easy magnetization axes of the teeth parts in the vicinity of a plane facing the rotor are approximately parallel with the axial direction of the rotor.

Clause 10. The rotating electric machine according to clause 9, wherein the second core includes yoke parts connecting the teeth parts, and in the yoke parts separated apart from the teeth parts, the directions having the highest magnetic permeability within a principal plane of the second pressed powder material are aligned in the rotational direction of the rotating electric machine.

Clause 11. A rotating electric machine comprising a rotor capable of rotating around a rotating shaft; and a stator disposed to face the rotor in the axial direction of the rotating shaft and including a second core and coils wound around the second core, the second core including a second pressed powder material having a plurality of second flaky magnetic metal particles and a second intercalated phase, the second flaky magnetic metal particles having an average thickness of from 10 nm to 100 μm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000, the second intercalated phase existing between the second flaky magnetic metal particles and including at least one second element selected from the group consisting of O, C, N, and F, wherein in the second pressed powder material, the second flat surfaces are oriented approximately in parallel with a second principal plane of the second pressed powder material and have the difference in magnetic permeability on the basis of direction within the second principal plane, and the second principal plane of the second pressed powder material is disposed to be approximately perpendicular to the radial direction of the rotating electric machine.

Clause 12. The rotating electric machine according to claim 11, wherein the second core includes a plurality of teeth parts, and in the teeth parts, the directions having the highest magnetic permeability within a principal plane of the second pressed powder material are aligned in the axial direction of the rotating electric machine.

Clause 13. The rotating electric machine according to clause 12, wherein the second core includes yoke parts connecting the teeth parts, and in the yoke parts, the directions having the highest magnetic permeability within a principal plane of the second pressed powder material are aligned in the rotational direction of the rotating electric machine.

Clause 14. The rotating electric machine according to clause 11, wherein the second core includes a plurality of teeth parts, and the easy magnetization axes of the teeth parts in the vicinity of a plane facing the rotor are approximately parallel with the axial direction of the rotor.

Clause 15. The rotating electric machine according to clause 14, wherein the second core includes yoke parts connecting the teeth parts, and in the yoke parts separated apart from the teeth parts, the directions having the highest magnetic permeability within a principal plane of the second pressed powder material are aligned in the rotational direction of the rotating electric machine.

Clause 16. A rotating electric machine comprising a rotor capable of rotating around a rotating shaft, the rotor having an annular-shaped first coil wound along the rotational direction of the rotor and first cores provided around at least a portion of the first coil; a stator disposed to face the rotor, the first core including a first pressed powder material having a plurality of first flaky magnetic metal particles and a first intercalated phase, the first flaky magnetic metal particles having an average thickness of from 10 nm to 100 μm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000, the first intercalated phase existing between the first flaky magnetic metal particles and including at least one second element selected from the group consisting of O, C, N, and F, wherein in the first pressed powder material, the first flat surfaces are oriented approximately in parallel with a first principal plane of the first pressed powder material and have the difference in magnetic permeability on the basis of direction within the first principal plane, and the first principal plane of the first pressed powder material is disposed to be approximately perpendicular to the winding direction of the first coil.

Clause 17. A rotating electric machine comprising a rotor capable of rotating around a rotating shaft; a stator disposed to face the rotor and having an annular-shaped second coil wound along the rotational direction of the rotor and a second core provided around at least a portion of the second coil, the second core including a second pressed powder material having a plurality of second flaky magnetic metal particles and a second intercalated phase, the second flaky magnetic metal particles having an average thickness of from 10 nm to 100 µm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000, the second intercalated phase existing between the second flaky magnetic metal particles and including at least one second element selected from the group consisting of O, C, N, and F, wherein in the second pressed powder material, the second flat surfaces are oriented approximately in parallel with a second principal plane of the second pressed powder material and have the difference in magnetic permeability on the basis of direction within the second principal plane, and the second principal plane of the second pressed powder material is disposed to be approximately perpendicular to the winding direction of the second coil.

Clause 18. A rotating electric machine comprising:

a first rotor including a first core;

a stator disposed to face the first rotor in the axial direction and including an annular-shaped coil wound along the rotational direction and a second core surrounding a portion of the coil; and a second rotor disposed to face the first rotor and the stator in the axial direction and including a third core, the stator being installed between the first rotor and the second rotor, wherein the first core or the third core includes a pressed powder material having a plurality of flaky magnetic metal particles and an intercalated phase, the flaky magnetic metal particles have an average thickness of from 10 nm to 100 µm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F, in the pressed powder material of the first core or the pressed powder material of the third core, the flat surfaces are oriented in parallel with a principal plane of the pressed powder material and have the difference in magnetic permeability on the basis of direction within the principal plane, and the principal plane of the pressed powder material is formed to be approximately perpendicular to the radial direction.

Clause 19. A rotating electric machine comprising:

a first rotor including a first core;

a stator disposed to face the first rotor in the axial direction and including an annular-shaped coil wound along the rotational direction and a second core surrounding a portion of the coil; and a second rotor disposed to face the first rotor and the stator in the axial direction and including a third core, the stator being installed between the first rotor and the second rotor, wherein the second core includes a pressed powder material having a plurality of flaky magnetic metal particles and an intercalated phase, the flaky magnetic metal particles have an average thickness of from 10 nm to 100 µm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F, in the pressed powder material of the second core, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

Clause 20. A rotating electric machine comprising:

a first rotor including a first core;

a stator disposed to face the first rotor in the axial direction and including an annular-shaped coil wound along the rotational direction and a second core surrounding a portion of the coil; and a second rotor disposed to face the first rotor and the stator in the axial direction and including a third core, the stator being installed between the first rotor and the second rotor, wherein the first core or the third core includes a first pressed powder material having a plurality of first flaky magnetic metal particles and a first intercalated phase, the first flaky magnetic metal particles have an average thickness of from 10 nm to 100 µm, each first flaky magnetic metal particle has a first flat surface and a magnetic metal phase including at least one first element selected from the group consisting of Fe, Co, and Ni, the average value of the ratio of the average length in the first flat surface with respect to thickness is from 5 to 10,000, the first intercalated phase exists between the first flaky magnetic metal particles and includes at least one second element selected from the group consisting of O, C, N, and F, in the first pressed powder material of the first core or the first pressed powder material of the third core, the first flat surfaces are oriented in parallel with a first principal plane of the first pressed powder material and have the difference in magnetic permeability on the basis of direction within the first principal plane, the first principal plane of the first pressed powder material is formed to be approximately perpendicular to the radial direction, the second core includes a second pressed powder material having a plurality of second flaky magnetic metal particles and a second intercalated phase, the second flaky magnetic metal particles have an average thickness of from 10 nm to 100 μm, each second flaky magnetic metal particle has a second flat surface and a magnetic metal phase including at least one first element selected from the group consisting of Fe, Co, and Ni, the average value of the ratio of the average length in the second flat surface with respect to thickness is from 5 to 10,000, the second intercalated phase exists between the second flaky magnetic metal particles and includes at least one second element selected from the group consisting of O, C, N, and F, in second the pressed powder material of the second core, the second flat surfaces are oriented in parallel with a second principal plane of the second pressed powder material and have the difference in magnetic permeability on the basis of direction within the second principal plane, and the second principal plane of the second pressed powder material is formed to be approximately perpendicular to the winding direction of the annular-shaped coil.

Clause 21. A rotating electric machine comprising:
a first rotor including a first core;
a first stator disposed to face the first rotor in the axial direction and including an annular-shaped first coil wound along the rotational direction and a second core surrounding a portion of the first coil; and
a second stator disposed to face the first rotor and the first stator in the axial direction and including an annular-shaped second coil wound along the rotational direction and a third core surrounding a portion of the second coil, the first rotor being installed between the first stator and the second stator,
wherein the second core or the third core includes a pressed powder material having a plurality of flaky magnetic metal particles and an intercalated phase, the flaky magnetic metal particles have an average thickness of from 10 nm to 100 μm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F,
in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

Clause 22. A rotating electric machine comprising:
a first rotor including a first core;
a first stator disposed to face the first rotor in the axial direction and including an annular-shaped first coil wound along the rotational direction and a second core surrounding a portion of the first coil; and
a second stator disposed to face the first rotor and the first stator in the axial direction and including an annular-shaped second coil wound along the rotational direction and a third core surrounding a portion of the second coil, the first rotor being installed between the first stator and the second stator,
wherein the first core includes a pressed powder material having a plurality of flaky magnetic metal particles and an intercalated phase, the flaky magnetic metal particles have an average thickness of from 10 nm to 100 μm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F.

in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the radial direction.

Clause 23. A rotating electric machine comprising:
a first rotor including a first core;
a first stator disposed to face the first rotor in the axial direction and including an annular-shaped first coil wound along the rotational direction and a second core surrounding a portion of the first coil; and
a second stator disposed to face the first rotor and the first stator in the axial direction and including an annular-shaped second coil wound along the rotational direction and a third core surrounding a portion of the second coil, the first rotor being installed between the first stator and the second stator,
wherein the second core or the third core includes a first pressed powder material having a plurality of first flaky magnetic metal particles and a first intercalated phase, the first flaky magnetic metal particles have an average thickness of from 10 nm to 100 μm, each first flaky magnetic metal particle has a first flat surface and a magnetic metal phase including at least one first element selected from the group consisting of Fe, Co, and Ni, the average value of the ratio of the average length in the first flat surface with respect to thickness is from 5 to 10,000, the first intercalated phase exists between the first flaky magnetic metal particles and includes at least one second element selected from the group consisting of O, C, N, and F,
in the first pressed powder material, the first flat surfaces are oriented in parallel with a first principal plane of the first pressed powder material and have the difference in magnetic permeability on the basis of direction within the first principal plane, the first principal plane of the first pressed powder material is formed to be approximately perpendicular to the winding direction of the annular-shaped coil,
the first core includes a second pressed powder material having a plurality of second flaky magnetic metal particles and a second intercalated phase, the second flaky magnetic metal particles have an average thickness of from 10 nm to 100 μm, each second flaky magnetic metal particle has a second flat surface and a magnetic metal phase including at least one first element selected from the group consisting of Fe, Co, and Ni, the average value of the ratio of the average length in the second flat surface with respect to thickness is from 5 to 10,000, the second intercalated phase exists between the second flaky magnetic metal particles and includes at least one second element selected from the group consisting of O, C, N, and F,
in the second pressed powder material, the second flat surfaces are oriented in parallel with a second principal plane of the pressed powder material and have the difference in magnetic permeability on the basis of direction within the second principal plane, and the second principal plane of the second pressed powder material is formed to be approximately perpendicular to the radial direction.

Clause 24. The rotating electric machine according to clause 1 to 5, 16, 18, 20, 21 and 23, wherein in the first pressed powder material, the first flaky magnetic metal particles have the directions having the highest magnetic permeability within the first flat surface aligned in a predetermined single direction.

Clause 25. The rotating electric machine according to clause 1 to 5, 16, 18, 20, 21 and 23, wherein in the first flaky magnetic metal particles, the directions having the highest magnetic permeability within the first flat surface are formed along a predetermined curve by sequentially changing the angle with respect to the axial direction of the rotating electric machine.

Clause 26. The rotating electric machine according to clause 6 to 15, 17, 19, 20, 22 and 23, wherein in the second pressed powder material, the second flaky magnetic metal particles have the directions having the highest magnetic permeability within the second flat surface aligned in a predetermined single direction.

Clause 27. The rotating electric machine according to clause 6 to 15, 17, 19, 20, 22 and 23, wherein in the second flaky magnetic metal particles, the directions having the highest magnetic permeability within the second flat surface are formed along a predetermined curve by sequentially changing the angle with respect to the axial direction of the rotating electric machine.

What is claimed is:

1. A rotating electric machine comprising a rotor including a first core and being capable of rotating around a rotating shaft; and a stator disposed to face the rotor in the axial direction of the rotating shaft,
    the first core including a first pressed powder material having a plurality of first flaky magnetic metal particles and a first intercalated phase,
    the first flaky magnetic metal particles having an average thickness of from 10 nm to 100 µm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000,
    the first intercalated phase existing between the first flaky magnetic metal particles and including at least one second element selected from the group consisting of oxygen (O), carbon (C), nitrogen (N), and fluorine (F),
    wherein in the first pressed powder material, the first flat surfaces are oriented approximately in parallel with a first principal plane of the first pressed powder material and have the difference in magnetic permeability on the basis of direction within the first principal plane, and
    the first principal plane of the first pressed powder material is disposed to be approximately perpendicular to the radial direction of the rotating electric machine.

2. The rotating electric machine according to claim 1, wherein in the first pressed powder material, the first flaky magnetic metal particles have the directions having the highest magnetic permeability within the first flat surface aligned in a predetermined single direction.

3. The rotating electric machine according to claim 1, wherein in the first flaky magnetic metal particles, the directions having the highest magnetic permeability within the first flat surface are formed along a predetermined curve by sequentially changing the angle with respect to the axial direction of the rotating electric machine.

4. A rotating electric machine comprising a rotor capable of rotating around a rotating shaft; and a stator disposed to face the rotor in the axial direction of the rotating shaft and including a second core and coils wound around the second core,
    the second core including a second pressed powder material having a plurality of second flaky magnetic metal particles and a second intercalated phase,
    the second flaky magnetic metal particles having an average thickness of from 10 nm to 100 µm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000,
    the second intercalated phase existing between the second flaky magnetic metal particles and including at least one second element selected from the group consisting of O, C, N, and F,
    wherein in the second pressed powder material, the second flat surfaces are oriented approximately in parallel with a second principal plane of the second pressed powder material and have the difference in magnetic permeability on the basis of direction within the second principal plane, and
    the second principal plane of the second pressed powder material is disposed to be approximately perpendicular to the radial direction of the rotating electric machine.

5. The rotating electric machine according to claim 4, wherein in the second pressed powder material, the second flaky magnetic metal particles have the directions having the highest magnetic permeability within the second flat surface aligned in a predetermined single direction.

6. The rotating electric machine according to claim 4, wherein in the second flaky magnetic metal particles, the directions having the highest magnetic permeability within the second flat surface are formed along a predetermined curve by sequentially changing the angle with respect to the axial direction of the rotating electric machine.

7. A rotating electric machine comprising a rotor capable of rotating around a rotating shaft, the rotor having an annular-shaped first coil wound along the rotational direction of the rotor and first cores provided around at least a portion of the first coil; a stator disposed to face the rotor,
    the first core including a first pressed powder material having a plurality of first flaky magnetic metal particles and a first intercalated phase,
    the first flaky magnetic metal particles having an average thickness of from 10 nm to 100 µm, each first flaky magnetic metal particle having a first flat surface and a first magnetic metal phase including at least one first element selected from the group consisting of Fe, Co, and Ni, the average value of the ratio of the average length in the first flat surface with respect to the average thickness being from 5 to 10,000,
    the first intercalated phase existing between the first flaky magnetic metal particles and including at least one second element selected from the group consisting of O, C, N, and F,
    wherein in the first pressed powder material, the first flat surfaces are oriented approximately in parallel with a first principal plane of the first pressed powder material and have the difference in magnetic permeability on the basis of direction within the first principal plane, and
    the first principal plane of the first pressed powder material is disposed to be approximately perpendicular to the winding direction of the first coil.

8. The rotating electric machine according to claim 7, wherein in the first pressed powder material, the second flaky magnetic metal particles have the directions having the highest magnetic permeability within the first flat surface aligned in a predetermined single direction.

9. The rotating electric machine according to claim 7, wherein in the first flaky magnetic metal particles, the directions having the highest magnetic permeability within the first flat surface are formed along a predetermined curve by sequentially changing the angle with respect to the axial direction of the rotating electric machine.

10. A rotating electric machine comprising a rotor capable of rotating around a rotating shaft; a stator disposed to face the rotor and having an annular-shaped second coil wound along the rotational direction of the rotor and a second core provided around at least a portion of the second coil,
the second core including a second pressed powder material having a plurality of second flaky magnetic metal particles and a second intercalated phase,
the second flaky magnetic metal particles having an average thickness of from 10 nm to 100 μm, each second flaky magnetic metal particle having a second flat surface and a second magnetic metal phase including at least one first element selected from the group consisting of Fe, Co, and Ni, the average value of the ratio of the average length in the second flat surface with respect to the average thickness being from 5 to 10,000,
the second intercalated phase existing between the second flaky magnetic metal particles and including at least one second element selected from the group consisting of O, C, N, and F,
wherein in the second pressed powder material, the second flat surfaces are oriented approximately in parallel with a second principal plane of the second pressed powder material and have the difference in magnetic permeability on the basis of direction within the second principal plane, and
the second principal plane of the second pressed powder material is disposed to be approximately perpendicular to the winding direction of the second coil.

11. The rotating electric machine according to claim 10, wherein in the second pressed powder material, the second flaky magnetic metal particles have the directions having the highest magnetic permeability within the second flat surface aligned in a predetermined single direction.

12. The rotating electric machine according to claim 10, wherein in the second flaky magnetic metal particles, the directions having the highest magnetic permeability within the second flat surface are formed along a predetermined curve by sequentially changing the angle with respect to the axial direction of the rotating electric machine.

13. A rotating electric machine comprising:
a first rotor including a first core;
a stator disposed to face the first rotor in the axial direction and including an annular-shaped coil wound along the rotational direction and a second core surrounding a portion of the coil; and
a second rotor disposed to face the first rotor and the stator in the axial direction and including a third core, the stator being installed between the first rotor and the second rotor,
wherein the first core or the third core includes a pressed powder material having a plurality of flaky magnetic metal particles and an intercalated phase, the flaky magnetic metal particles have an average thickness of from 10 nm to 100 μm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F,
in the pressed powder material of the first core or the pressed powder material of the third core, the flat surfaces are oriented in parallel with a principal plane of the pressed powder material and have the difference in magnetic permeability on the basis of direction within the principal plane, and the principal plane of the pressed powder material is formed to be approximately perpendicular to the radial direction.

14. A rotating electric machine comprising:
a first rotor including a first core;
a stator disposed to face the first rotor in the axial direction and including an annular-shaped coil wound along the rotational direction and a second core surrounding a portion of the coil; and
a second rotor disposed to face the first rotor and the stator in the axial direction and including a third core, the stator being installed between the first rotor and the second rotor,
wherein the second core includes a pressed powder material having a plurality of flaky magnetic metal particles and an intercalated phase, the flaky magnetic metal particles have an average thickness of from 10 nm to 100 μm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F,
in the pressed powder material of the second core, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

15. A rotating electric machine comprising:
a first rotor including a first core;
a first stator disposed to face the first rotor in the axial direction and including an annular-shaped first coil wound along the rotational direction and a second core surrounding a portion of the first coil; and
a second stator disposed to face the first rotor and the first stator in the axial direction and including an annular-shaped second coil wound along the rotational direction and a third core surrounding a portion of the second coil, the first rotor being installed between the first stator and the second stator,
wherein the second core or the third core includes a pressed powder material having a plurality of flaky magnetic metal particles and an intercalated phase, the flaky magnetic metal particles have an average thickness of from 10 nm to 100 μm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F, in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the winding direction of the annular-shaped coil.

16. A rotating electric machine comprising:

a first rotor including a first core;

a first stator disposed to face the first rotor in the axial direction and including an annular-shaped first coil wound along the rotational direction and a second core surrounding a portion of the first coil; and a second stator disposed to face the first rotor and the first stator in the axial direction and including an annular-shaped second coil wound along the rotational direction and a third core surrounding a portion of the second coil, the first rotor being installed between the first stator and the second stator, wherein the first core includes a pressed powder material having a plurality of flaky magnetic metal particles and an intercalated phase, the flaky magnetic metal particles have an average thickness of from 10 nm to 100 µm, each flaky magnetic metal particle has a flat surface and a magnetic metal phase including at least one first element selected from the group consisting of Fe, Co, and Ni, the average value of the ratio of the average length in the flat surface with respect to thickness is from 5 to 10,000, the intercalated phase exists between the flaky magnetic metal particles and includes at least one second element selected from the group consisting of O, C, N, and F, in the pressed powder material, the flat surfaces are oriented in parallel with a principal plane of the pressed powder material and have the difference in magnetic permeability on the basis of direction within the principal plane, and the principal plane of the pressed powder material is formed to be approximately perpendicular to the radial direction.

* * * * *